(12) United States Patent
Shimizu et al.

(10) Patent No.: US 8,066,092 B2
(45) Date of Patent: Nov. 29, 2011

(54) ELECTRIC POWER STEERING DEVICE

(75) Inventors: Yasuo Shimizu, Saitama (JP); Katsuji Watanabe, Saitama (JP); Atsuhiko Yoneda, Saitama (JP); Shigeru Yamawaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 12/290,882

(22) Filed: Nov. 4, 2008

(65) Prior Publication Data
US 2009/0114470 A1 May 7, 2009

(30) Foreign Application Priority Data

Nov. 6, 2007 (JP) .................................. 2007-288070
Aug. 29, 2008 (JP) .................................. 2008-221214

(51) Int. Cl.
*B62D 5/04* (2006.01)
(52) U.S. Cl. ......................... 180/444; 180/443; 180/446
(58) Field of Classification Search .................. 180/443, 180/444, 446
See application file for complete search history.

(56) References Cited

U.S. PATENT DOCUMENTS

| | | | |
|---|---|---|---|
| 4,727,950 A | 3/1988 | Shimizu et al. | |
| 6,422,095 B1 * | 7/2002 | Shimizu et al. | 73/862.335 |
| 6,481,526 B1 | 11/2002 | Millsap et al. | |
| 6,598,695 B1 * | 7/2003 | Menjak et al. | 180/402 |
| 6,799,654 B2 * | 10/2004 | Menjak et al. | 180/402 |
| 6,820,713 B2 * | 11/2004 | Menjak et al. | 180/402 |
| 7,147,076 B2 * | 12/2006 | Izumi | 180/250 |
| 7,641,022 B2 * | 1/2010 | Okada et al. | 180/444 |
| 2003/0146038 A1 * | 8/2003 | Mills et al. | 180/422 |
| 2006/0081409 A1 * | 4/2006 | Chikaraishi | 180/402 |
| 2006/0219452 A1 * | 10/2006 | Okada et al. | 180/68.5 |
| 2008/0053743 A1 * | 3/2008 | Tomita | 180/443 |

FOREIGN PATENT DOCUMENTS

| | | |
|---|---|---|
| EP | 1 205 372 A2 | 5/2002 |
| EP | 1 205 372 A3 | 5/2002 |
| EP | 1 332 941 A2 | 8/2003 |
| EP | 1 332 941 A3 | 8/2003 |
| EP | 1 342 639 A2 | 9/2003 |
| EP | 1 342 639 A3 | 9/2003 |
| JP | 61-184171 | 8/1986 |
| JP | 10-194152 | 7/1998 |
| JP | 2003-048550 | 2/2003 |
| JP | 2004-189037 | 7/2004 |
| JP | 2006-001510 A | 1/2006 |
| JP | 2006-205887 A | 8/2006 |
| JP | 2006-248252 | 9/2006 |
| JP | 2006-322952 | 11/2006 |
| JP | 2007-261408 | 10/2007 |
| WO | WO 89/02387 | 3/1989 |
| WO | WO 03/091081 A1 | 11/2003 |

\* cited by examiner

*Primary Examiner* — Anne Marie Boehler
*Assistant Examiner* — Marc Scharich
(74) *Attorney, Agent, or Firm* — Carrier Blackman & Associates, P.C.; Joseph P. Carrier; William D. Blackman

(57) ABSTRACT

An electric power steering device is configured to transmit an auxiliary torque to a steering unit of front wheels, and includes: an operator; an electric motor configured to generate the auxiliary torque in accordance with at least a steering torque generated by input from the operator; the steering unit of front wheels which includes a pinion shaft; and a rotation terminating mechanism which provides a motion terminating end of the operator, the rotation terminating mechanism being disposed between the operator and the pinion shaft.

13 Claims, 25 Drawing Sheets

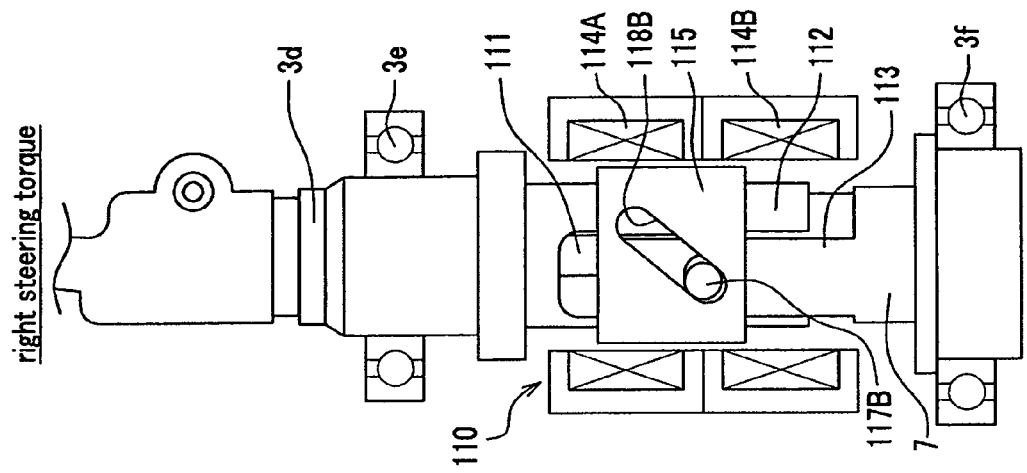
FIG. 4c right steering torque
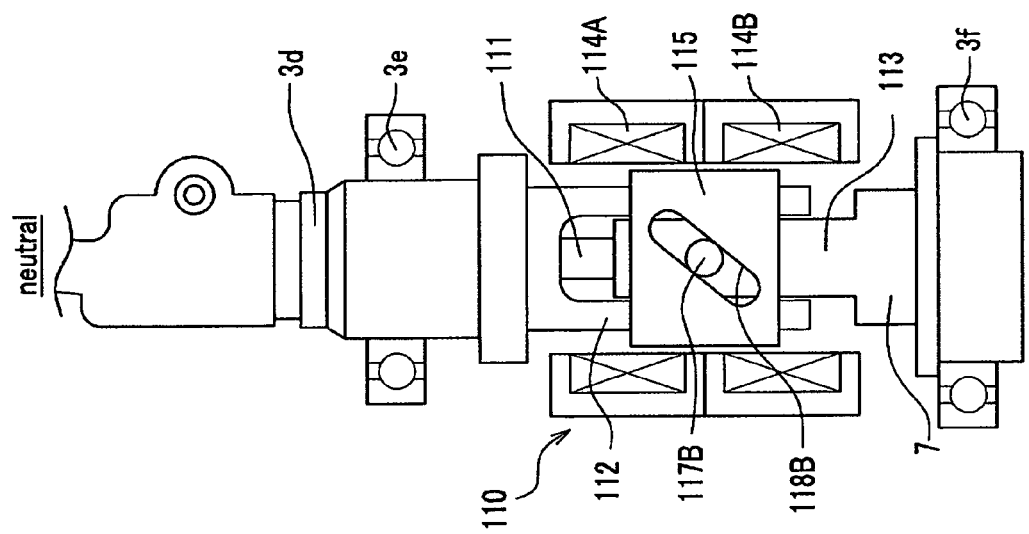
FIG. 4a neutral
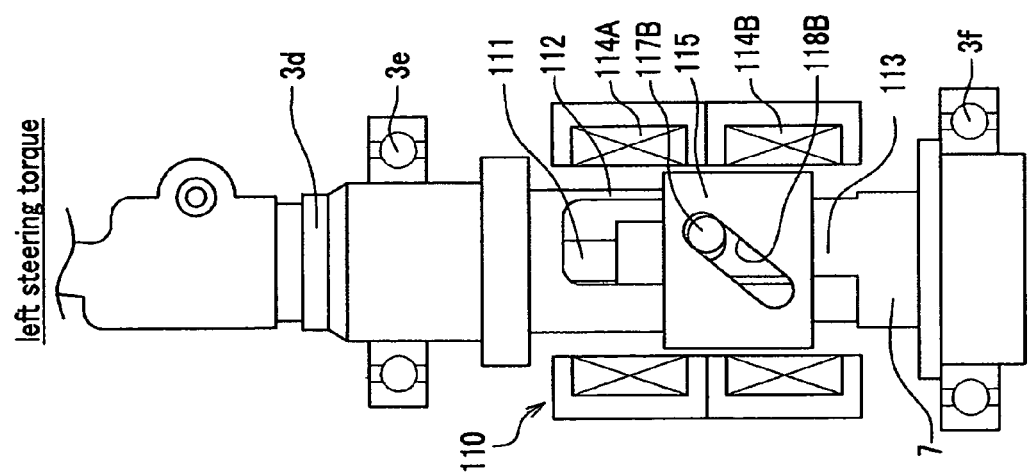
FIG. 4b left steering torque right rack end neutral left rack end

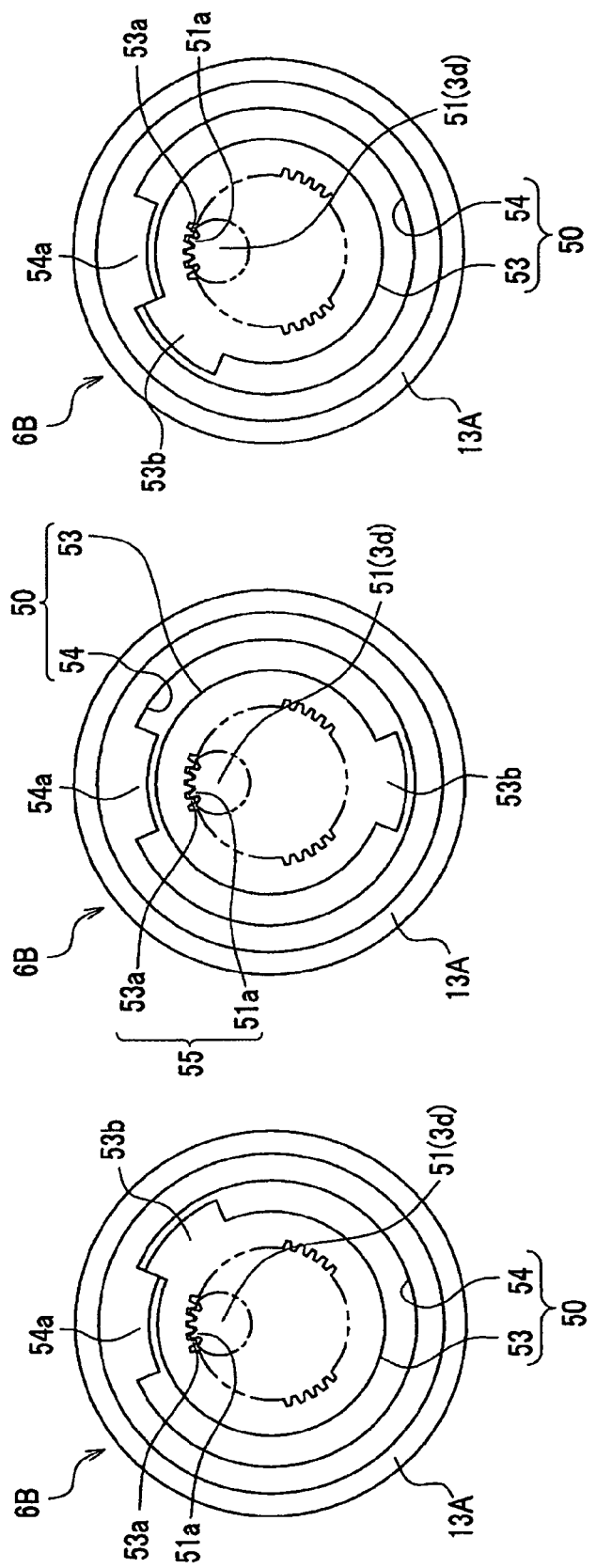

left rack end neutral right rack end

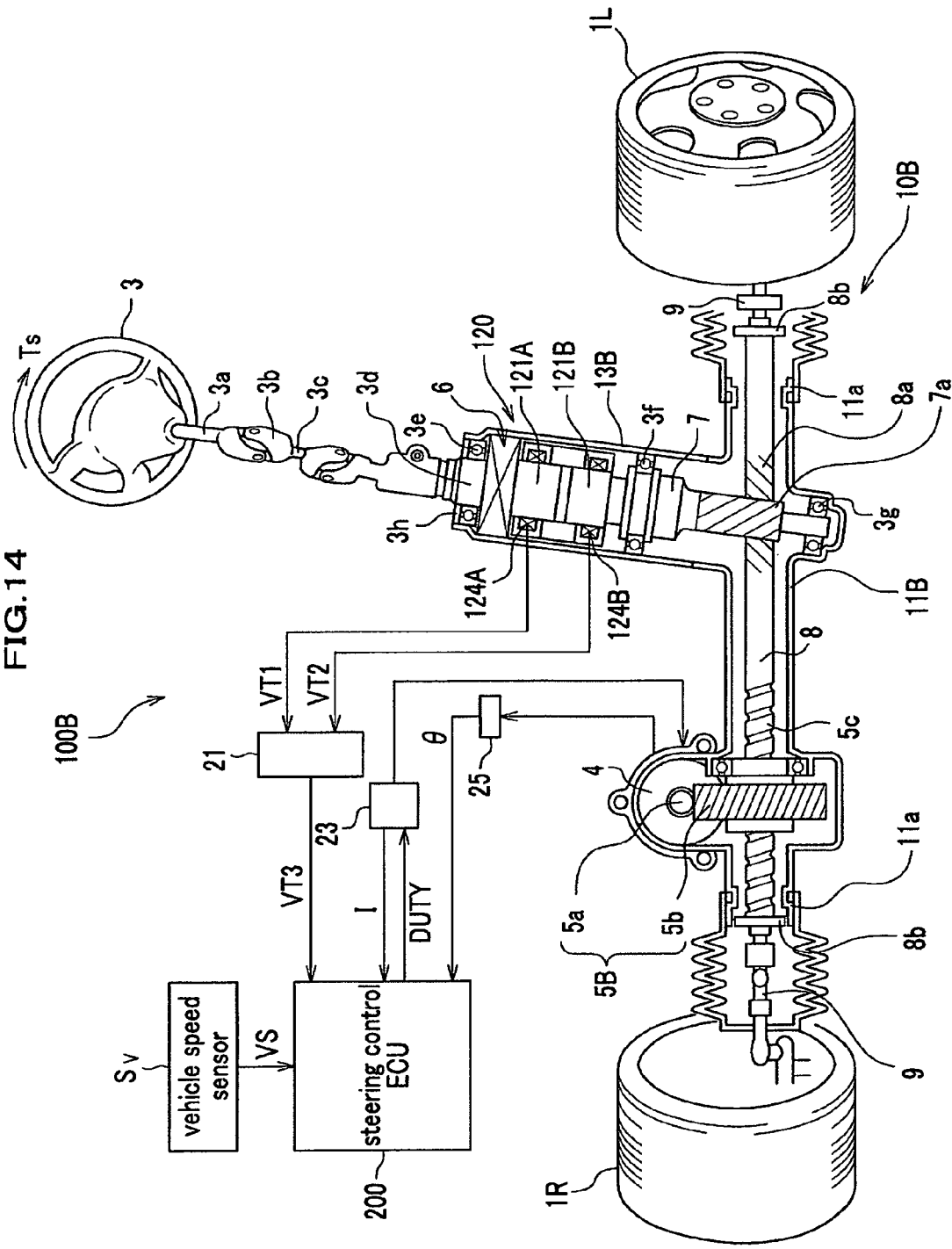

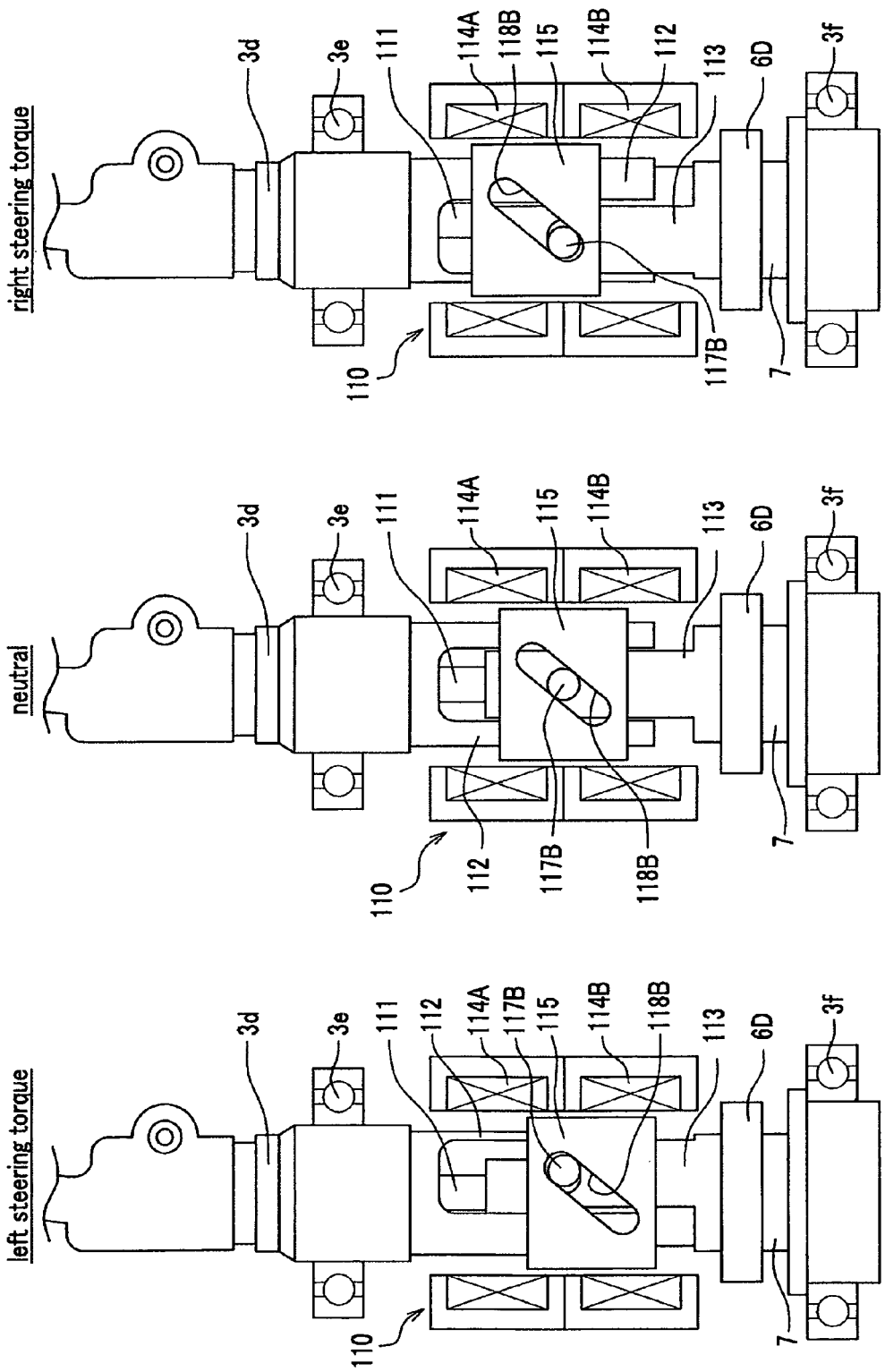

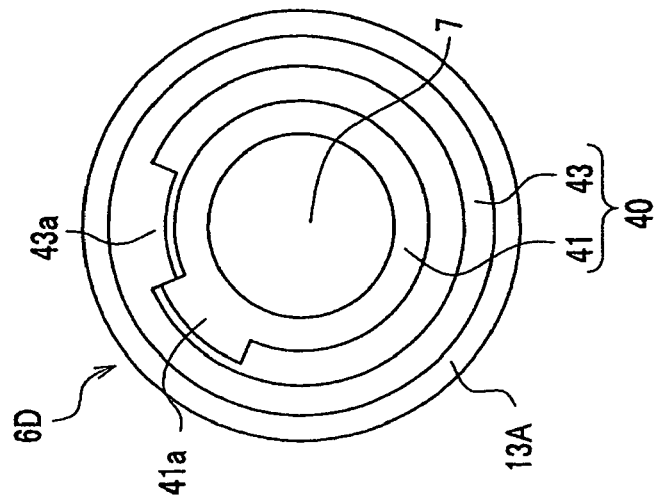
FIG. 19c right rack end
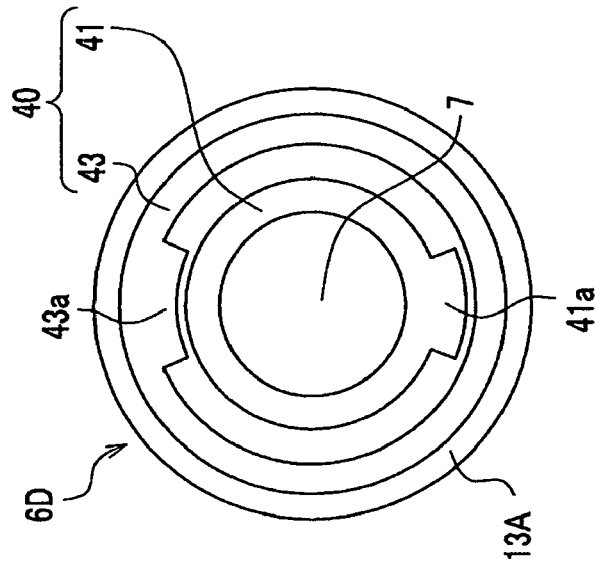
FIG. 19a neutral
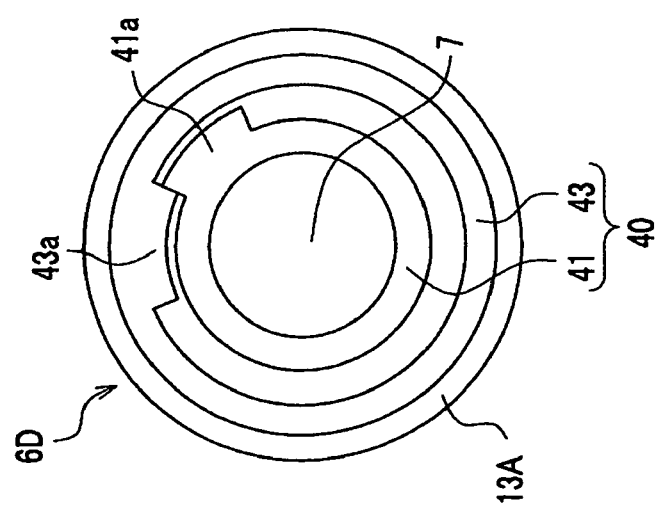
FIG. 19b left rack end right rack end neutral left rack end

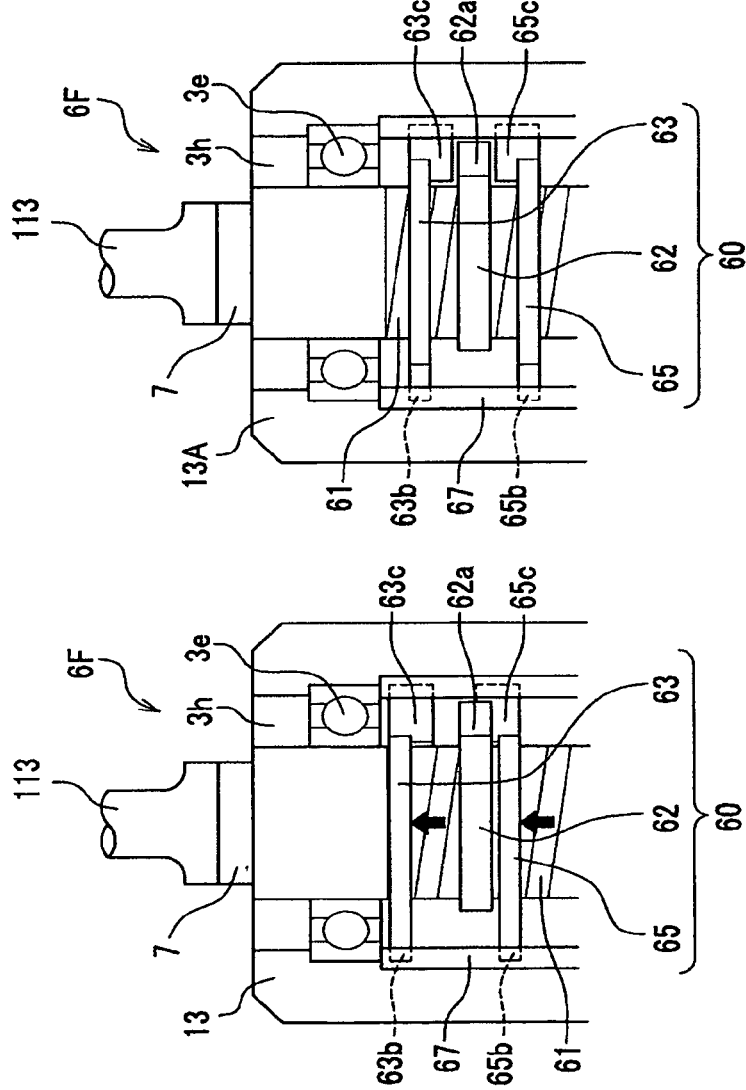

ELECTRIC POWER STEERING DEVICE

CROSS-REFERENCE TO RELATED APPLICATIONS

This application claims the foreign priority benefit under Title 35, United States Code, section 119 (a)-(d), of Japanese Patent Applications No. 2007-288070 filed on Nov. 6, 2007 and No. 2008-221214 filed on Aug. 29, 2008 in the Japan Patent Office, the disclosures of which are herein incorporated by reference in their entirety.

BACKGROUND OF THE INVENTION

1. Field of the Invention

The present invention relates to an electric power steering device in which an auxiliary steering force is imparted from an electric motor to a steering unit of a vehicle such as an automobile.

2. Description of the Related Art

An electric power steering device is a device in which an electric motor generates an auxiliary torque in accordance with a magnitude of a steering torque, and the auxiliary torque is transmitted to a steering unit, to thereby reduce a steering effort required by a driver for steering.

In a general electric power steering device, in order to prevent a steering turn of wheels from exceeding a certain range, a rack shaft has rack ends and a rack housing portion for containing the rack shaft has housing ends, with the rack end and housing end on the same side forming a rack end mechanism. When a steering wheel is turned to a predetermined angle to the right or left from a neutral position and an angle of steering turn of the wheels reaches the maximum (hereinafter, this angle of the wheels, as well as angle of the steering wheel or the like that imparts this angle of the wheels, is referred to as "rack end angle"), in either of the right and left rack end mechanisms, the rack end and the housing end are brought into contact with each other, and thus the wheels cannot perform further steering turn in the same direction.

Accordingly, when the steering wheel is turned close to the rack end angle and then a large steering torque is applied to the steering wheel, the steering wheel soon reaches the rack end angle and the wheels cannot perform further steering turn, and thus the driver may input a larger steering torque. In accordance with this larger steering torque, a larger auxiliary steering force is imparted from the electric motor to the steering unit, which may lead to a large impact on the rack end mechanism, or a large overload on rack-and-pinion gears, resulting in large impact noise, damage or deformation of components, or the like. Furthermore, due to a rotational kinetic energy caused by inertia moment of the electric motor, overshoot of the electric motor rotation may occur, which may also lead to a large impact or large overload on components, such as rack gear, resulting in damage or deformation.

In order to solve these problems, for example, Japanese examined patent publication No. 6-4417 discloses a device in which, when a steering angle (amount of operation) of a steering wheel reaches a predetermined angle at a position near the rack end angle, a target current value is reduced as the turning angle of wheels increases, and when the turning angle of wheels reaches the rack end angle, the target current value is set to zero, to thereby prevent the rack end mechanism from suffering a large impact.

However, in the device of Japanese examined patent publication No. 6-4417, when the steering wheel is turned in an opposite direction at a position near the rack end angle, a target current value is limited until the turning angle becomes the predetermined angle or less, and thus a sufficient auxiliary steering force in accordance with the steering torque cannot be supplied to the steering unit. As a result, the steering wheel becomes heavier, a practical rack end angle to which the driver can operate the steering wheel becomes smaller, and the steering wheel cannot be turned to the rack end angle which is mechanically set.

In order to solve this problem, Japanese unexamined patent publication No. 2006-248252 (see paragraphs [0038] and [0047]) discloses a device in which, when the wheels are at a certain turning angle θ1 or more near the rack end angle, and when a rotational speed $\omega_M$ of the motor is a set value ω1 or more, a gain of a steering torque value T is reduced.

In addition, when the steering angle (amount of operation) is a certain value or more near the rack end angle, and only when the steering wheel is further tuned away from the home position, a feedback gain of an electric motor angular velocity is increased.

However, in the technique disclosed in Japanese unexamined patent publication No. 2006-248252, when the rack end of the rack shaft and the housing end of the housing, on one of the right and left sides, are brought into contact with each other, and the driver turns the steering wheel further away from the home position, the torque sensor detects a steering torque and thus the motor generates an assist torque in a direction of turning further away. As a result, a stronger force is further applied to the rack end and housing end which have been already brought into contact with each other. In addition, when an absolute value of a rotational speed ω of the motor is smaller than a set value |ω1|, or when the rack end is brought into contact at a high rotational speed ω of the motor, the rotation of the electric motor may undergo overshoot due to the kinetic energy by the inertia moment of the electric motor, and thus components, such as rack gear, may still suffer a large impact or overload. Accordingly, even when the steering wheel is further turned away from the home position under a situation where the rack end and the housing end are already brought into contact, in order to prevent a problem in a mechanical normality of the steering unit which may otherwise be caused by this load, it is necessary to reinforce the motor, the deceleration mechanism (worm gear, worm wheel gear), the rack gear, the pinion gear, the bearing, the housing and the like. Moreover, due to the overload on the motor, the motor may be burnt out.

Therefore, it would be desirable to provide an electric power steering device in which the rack-and-pinion gears do not suffer overload (overload is suppressed), the assist is limited at a position near the rack end, and the components are prevented from suffering impact.

SUMMARY OF THE INVENTION

In one aspect of the present invention, there is provided an electric power steering device configured to transmit an auxiliary torque to a steering unit of front wheels, the electric power steering device including: an operator; an electric motor configured to generate the auxiliary torque in accordance with at least a steering torque generated by input from the operator; the steering unit of front wheels which includes a pinion shaft; and a rotation terminating mechanism which provides a motion terminating end of the operator, the rotation terminating mechanism being disposed between the operator and the pinion shaft.

In the above-mentioned electric power steering device, it is preferable that the rotation terminating mechanism includes a deceleration mechanism and is configured to alter an allowable range of turning operation of the operator limited by the motion terminating end.

According to this structure, the rotation terminating mechanism can alter the allowable range of turning operation of the operator, by the deceleration mechanism. Therefore, the driver operating the steering wheel (operator) can be provided with the same range of steering angle (operation amount) including right and left as the range in the conventional device.

In addition, it is preferable that the electric power steering device described above further includes a torque sensor configured to detect the steering torque, wherein the rotation terminating mechanism is disposed between the operator and the torque sensor.

According to this electric power steering device, when the operator reaches the motion terminating end, the rotation terminating mechanism blocks a further operation of the operator at the motion terminating end, and therefore, the torque sensor cannot detect a signal that otherwise generates further auxiliary torque by the electric motor in a blocked direction. In addition, even when the rotation of the electric motor undergoes overshoot, the device has a function of reducing the torque detected by the torque sensor.

Moreover, it is preferable that the electric power steering device described above further includes a torque sensor configured to detect the steering torque, wherein the steering unit of the front wheels further includes an auxiliary torque transmission mechanism, and the rotation terminating mechanism is disposed between the torque sensor and the auxiliary torque transmission mechanism.

According to this electric power steering device, when the operator reaches the motion terminating end, the rotation terminating mechanism blocks a further turning operation of the operator at the motion terminating end, and in addition, blocks the rotation of the pinion shaft disposed on an auxiliary torque transmission mechanism (for example, deceleration mechanism, specifically, worm wheel gear) side relative to the torque sensor, which pinion shaft rotates together with the auxiliary torque transmission mechanism. By blocking the rotation of the pinion shaft, the rack-and-pinion gears including the pinion gear provided on the pinion shaft (worm wheel) and the rack gear engaging with the pinion gear do not suffer overload caused along with a rotation of the pinion shaft that transmits an auxiliary torque. In addition, the angle of steering turn of wheels at which the rotation of the pinion shaft is blocked can serve as the rack end angle, which limits the assist at a position near the rack end.

Moreover, even when the rotation of the electric motor undergoes overshoot, the rotation terminating mechanism blocks the rotation of the pinion shaft, and thus the rotation by overshoot is not transmitted to the rack-and-pinion gears, preventing the rack-and-pinion gears from suffering the overload (suppressing the overload).

Further, it is desirable that, in the electric power steering device described above, the rotation terminating mechanism includes: an input shaft with an external gear, to which a rotation of a rotary shaft of the operator is transmitted; a ring gear having an internal gear configured to engage with the external gear of the input shaft, and having a first projection on an outer periphery of the ring gear; and a ring-shaped fixed portion surrounding the ring gear, wherein the external gear of the input shaft and the internal gear of the ring gear serves as the deceleration mechanism, and a second projection configured to limit a rotation of the first projection by being brought into contact with the first projection is provided on an inner periphery of the fixed portion.

In this rotation terminating mechanism, due to the external gear of the input shaft and the internal gear of the ring gear, a rotation angle of the ring gear can be reduced relative to a rotation angle of the input shaft, and thus the driver operating the steering wheel (operator) can be provided with the same range of steering angle (operation amount) including right and left as the range in the conventional device. In addition, by simply exchanging the ring gear, the operation amount of the steering wheel corresponding to the rack end angle can be altered, which allows an introduction of the steering device to various types of vehicles.

Furthermore, it is preferable that, in the electric power steering device described above, the rotation terminating mechanism includes: a planetary gear reducer unit as the deceleration mechanism including an outer ring gear, planetary gears, a planetary carrier and a sun gear, and a fixed portion for fixing the outer ring gear, wherein a first projection is provided on the planetary carrier, a rotation of a rotary shaft of the operator is transmitted to the sun gear, and a second projection configured to limit a rotation of the first projection by being brought into contact with the first projection is provided on at least one of the fixed portion and the outer ring gear.

In this rotation terminating mechanism, with the use of the planetary gear reducer unit, the rotation angle of the planetary carrier relative to the rotation angle of the sun gear can be reduced, and thus the driver operating the steering wheel (operator) can be provided with the same range of steering angle (operation amount) including right and left as the range in the conventional device. In addition, the rotation terminating mechanism can be mounted in a balanced manner, i.e., coaxially with the rotary shaft of the operator. At the same time, when the first projection and the second projection are brought into contact with each other, a load per planetary gear is shared by the planetary carrier, and thus the device can tolerate a larger load. Accordingly, the rotation terminating mechanism can be made smaller by that amount.

In addition, it is desirable that, in the electric power steering device described above, the rotation terminating mechanism includes: a thread portion with an external thread, to which a rotation of a rotary shaft of the operator is transmitted; a first stopper in a ring shape which has a first projection on an outer periphery of the first stopper and is fixed to the thread portion; a second stopper which has an internal thread configured to engage with the thread portion, is disposed above the first stopper, and has a second projection configured to be brought into contact with the first projection and formed in a lower face of the second stopper; a third stopper which has an internal thread configured to engage with the thread portion, is disposed below the first stopper, and has a third projection configured to be brought into contact with the first projection and formed in an upper face of the third stopper; and a guide member configured to limit rotations of the second and third stoppers and move the second and third stoppers along an axial direction of the thread portion, wherein the thread portion, the second stopper, the third stopper and the guide member serve as the deceleration mechanism.

In this rotation terminating mechanism, the rotation of the thread portion is converted into the vertical shift of the second and third stoppers, and the rotation angle of the thread portion until the first projection of the first stopper is brought into contact with the second projection of the second stopper or the third projection of the third stopper becomes large. Therefore, the driver operating the steering wheel (operator) can be provided with the same range of steering angle (operation amount) including right and left as the range in the conventional device. In addition, in this rotation terminating mechanism, the steering angle including right and left of the steering wheel can be set to a value as large as, for example, 2 turns or more (i.e., 720° or more), and thus can be applied to vehicles other than automobile. At the same time, since the device does not have gears, the outer diameter of the rotation terminating mechanism can be made small, further improving mountability on the vehicle.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 4 illustrates displacements of an upper loose part, a lower loose part and a slider when a steering torque is applied, in which (a) shows a neutral state, (b) shows a state in which a left steering torque is applied, and (c) shows a state in which a right steering torque is applied.

FIG. 10 shows schematic plane sections of a rotation terminating mechanism of a first modified version of the first embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).

FIGS. 13A to 13D are perspective views separately showing components of the rotation terminating mechanism of the third modified version of the first embodiment, in which: FIG. 13A is a perspective exterior view of an upper stopper; FIG. 13B is a perspective exterior view of a rotary stopper fixed to a thread portion; FIG. 3C is a perspective exterior view of a lower stopper; and FIG. 13D is a perspective exterior view of a guide member.

FIG. 14 is a configuration diagram of an electric power steering device according to a second embodiment of the present invention.

FIG. 18 illustrates displacements of an upper loose part, a lower loose part and a slider when a steering torque is applied, in which (a) shows a neutral state, (b) shows a state in which a left steering torque is applied, and (c) shows a state in which a right steering torque is applied.

FIG. 19 shows schematic plane sections of a rotation terminating mechanism of the fourth embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).

FIG. 23 shows schematic plane sections of a rotation terminating mechanism of a third modified version of the fourth embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).

FIGS. 24A to 24D are perspective views separately showing components of the rotation terminating mechanism of the third modified version of the fourth embodiment, in which: FIG. 24A is a perspective exterior view of an upper stopper; FIG. 24B is a perspective exterior view of a rotary stopper fixed to a thread portion; FIG. 24C is a perspective exterior view of a lower stopper; and FIG. 24D is a perspective exterior view of a guide member.

DETAILED DESCRIPTION OF PREFERRED EMBODIMENTS

Embodiments of the present invention will be described in detail below with reference to the accompanying drawings.

First Embodiment

A first embodiment of the present invention will be described with reference to FIGS. 1 to 9A-9C.

Figure 1:
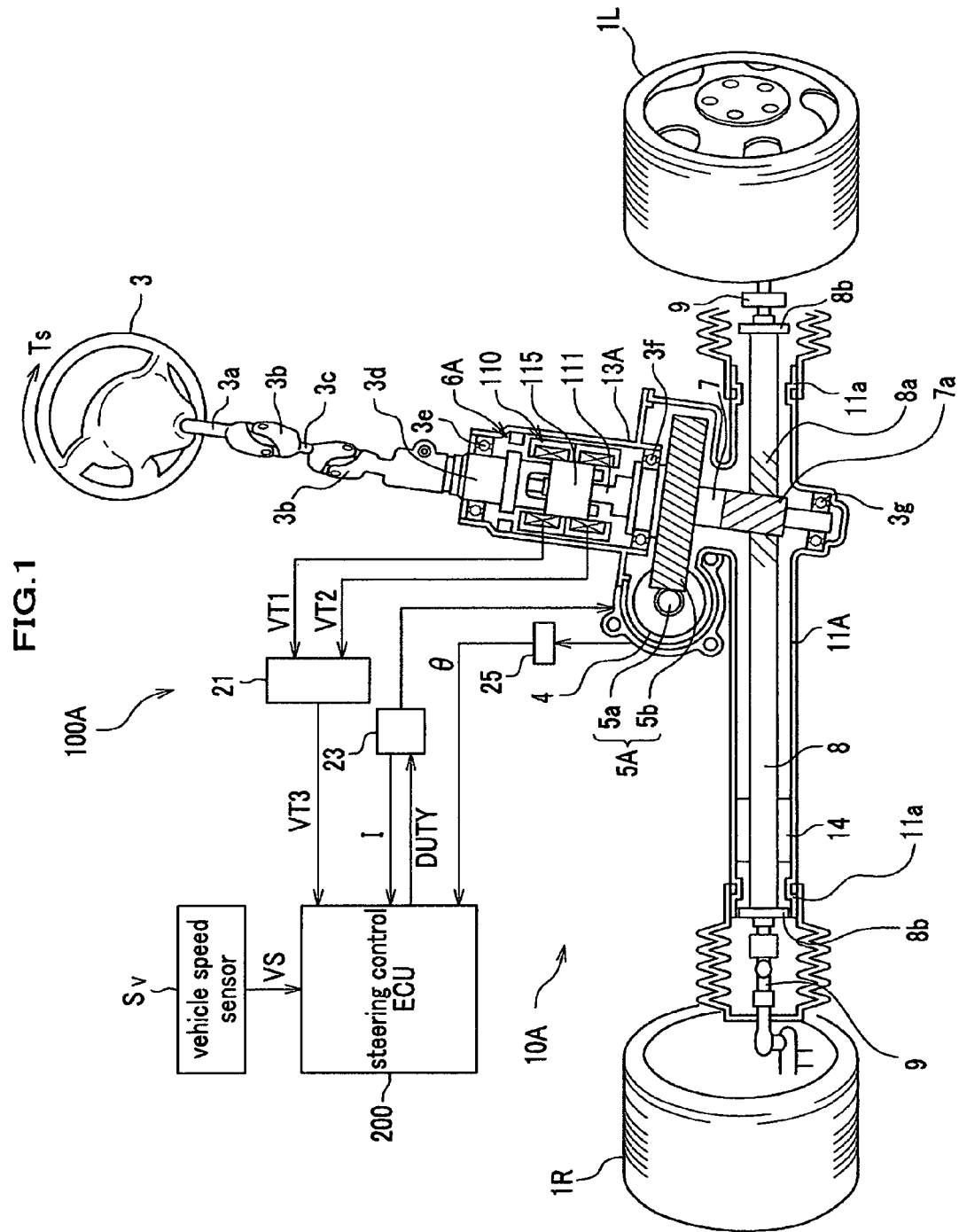
FIG. 1 is a configuration diagram of an electric power steering device according to a first embodiment of the present invention.

FIG. 1 is a configuration diagram of an electric power steering device according to the first embodiment of the present invention.

Figure 2:
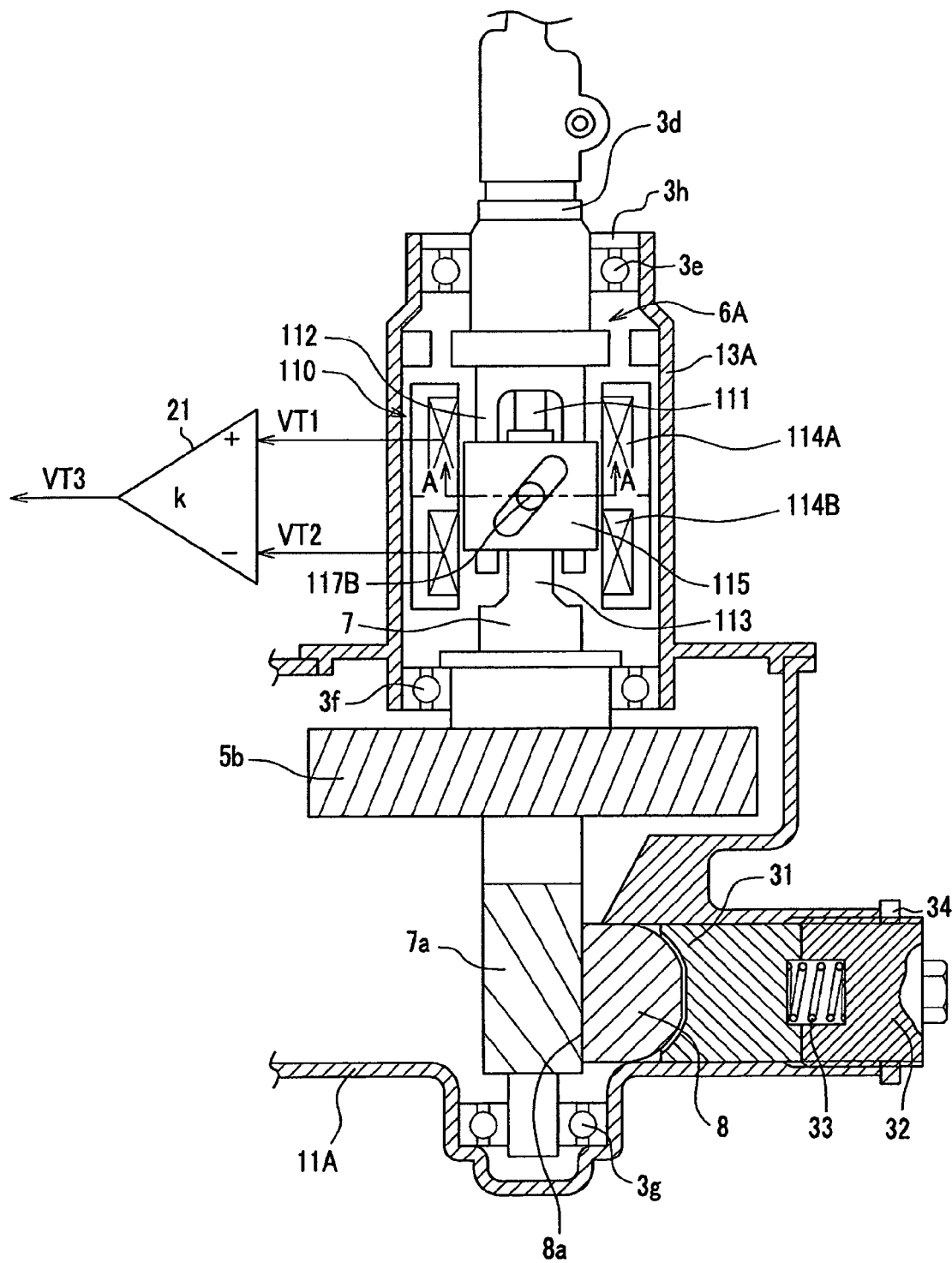
FIG. 2 is a side view showing portions around a torque sensor and a pinion gear in a steering gear box of FIG. 1.

FIG. 2 is a side view showing portions around a torque sensor and a pinion gear in a steering gear box of FIG. 1.

An electric power steering device 100A includes, as shown in FIG. 1, a steering wheel (operator) 3, a steering wheel shaft 3a attached thereto, a shaft 3c and an input shaft 3d, all of which shafts are connected through two universal joints 3b. The input shaft 3d is connected to a pinion shaft 7 through a torsion bar 111. On a lower end of the pinion shaft 7, there is provided a pinion gear 7a, which is configured to engage with a rack gear 8a of a rack shaft 8 which can reciprocate in a vehicle width direction. To respective ends of the rack shaft 8, the left front wheel 1L and the right front wheel 1R are connected through respective tie rods 9, 9.

As shown in FIG. 2, the rack shaft 8 is supported slidably in lateral directions in such a manner that the rack shaft 8 is pushed from an opposite side of the rack gear 8a toward a pinion gear 7a side by a rack guide 31. The rack gear 8a is pressed to the pinion gear 7a by an adjusting bolt 32 through a compression spring 33. A lock nut 34 is for preventing the adjusting bolt 32 from loosening.

As shown in FIG. 1, the pinion shaft 7 connected to the input shaft 3d through the torsion bar 111 is supported by a steering gear box 10A: an upper portion, a middle portion and a lower portion of the pinion shaft 7 are supported through bearings 3e, 3f and 3g, respectively.

On ends of the rack shaft 8, rack ends 8b, 8b are provided. Of the steering gear box 10A, a rack housing portion 11A is configured to hold the pinion gear 7a, the rack shaft 8 and the bearing 3g, as well as a sliding bearing 14 therein which allows a slidable movement of the rack shaft 8 in an axial direction of the rack shaft 8. On lateral ends of the rack housing portion 11A, housing ends 11a, 11a are provided.

Though the conventional rack end and housing end are configured to limit the maximum turning angle of the wheels (rack end angle), the rack ends 8b, 8b and the housing ends 11a, 11a are provided not for the same purpose, but only for centering the movement of the rack shaft 8 during a unit assembly of the steering gear box 10A upon a vehicle production or the like.

Therefore, in the present embodiment, the maximum turning angle of the wheels (rack end angle) is limited in terms of an operation amount (steering angle) of the steering wheel 3 fully to the right and the left, which is set by a rotation terminating mechanism 6A (which will be described later), while the rack end 8b and the rack housing 11a for positioning during the assembly have a room therebetween so as not to come into contact with each other at the maximum turning angle of the wheels.

In all of the following embodiments and modified versions thereof, with respect to rotation terminating mechanisms (6, 6A, 6B, 6B', 6C, 6D, 6E, 6E', 6F), the expression "rack end angle" means the maximum setting turning angle of the wheels defined by the rotation terminating mechanism.

With this configuration, the electric power steering device 100A can change traveling direction of the vehicle during the operation of the steering wheel 3. Herein, the rack shaft 8, the rack gear 8a and the tie rods 9, 9 form a steering wheel turn mechanism.

The electric power steering device 100A also has an electric motor 4 for supplying an auxiliary steering effort (auxiliary torque) to reduce a steering effort (steering torque) required at the steering wheel 3. The electric motor 4 has an output shaft with a worm gear 5a which engages with a worm wheel gear 5b provided on the pinion shaft 7.

In other words, the worm gear 5a and the worm wheel gear 5b form a deceleration mechanism (auxiliary torque transmission mechanism) 5A. In addition, a rotor of the electric motor 4, and the components connected to the electric motor 4, such as the worm gear 5a, the worm wheel gear 5b, the pinion shaft 7, the rack shaft 8, the rack gear 8a and the tie rods 9, 9, form a steering unit.

The electric motor 4 is a three-phase brushless motor formed of a stator (not shown) with a plurality of field coils as well as the rotor (not shown) which rotates in the stator, for converting electric power to mechanical power ($PM = \omega_M T_M$).

Herein, $\omega_M$ represents a rotational angular velocity (hereinbelow, also simply referred to as "angular velocity") of the electric motor 4, and $T_M$ represents a torque generated at the electric motor 4.

Herein a steering torque applied to the steering wheel 3 is represented as Ts, an assist amount by the torque (auxiliary torque) generated at the electric motor 4, which has been powered through the deceleration mechanism, is represented as $A_H$, and a coefficient of the assist amount $A_H$ is represented as, for example, $k_A(VS)$, which varies as a function of the vehicle speed VS. Since the formula $A_H = k_A(VS) \times Ts$ is established in this case, a pinion torque Tp applied to the pinion shaft 7 can be represented by the following formula (1):

$$Tp = Ts + A_H \qquad (1)$$
$$= Ts + k_A(VS) \times Ts$$

From this formula, the steering torque Ts can be represented by the following formula (2).

$$Ts = Tp/(1 + k_A(VS)) \qquad (2)$$

Therefore, the steering torque Ts is reduced to $1/(1+k_A(VS))$ of the pinion torque Tp (load). For example, if $k_A(0)=2$ with the vehicle speed VS=0 km/h, the steering torque Ts is controlled to one third of the pinion torque Tp, and if $k_A(100)=0$ with the vehicle speed VS=100 km/h, the steering torque Ts is controlled to be equal to the pinion torque Tp, which provides a responsive feeling from a steady steering torque, similar to those obtained in the manual steering. In other words, by controlling the steering torque Ts in accordance with the vehicle speed VS, the responsive feeling from the steering torque becomes light when the vehicle runs at a lower speed, and steady and stable when the vehicle runs at a higher speed.

In addition, the electric power steering device 100A also includes an electric motor drive circuit 23 configured to drive the electric motor 4; a resolver 25; a torque sensor 110 configured to detect (measure) a pinion torque Tp applied to the pinion shaft 7; a differential amplifier 21 configured to amplify the output from the torque sensor 110; the vehicle speed sensor Sv configured to detect (measure) a vehicle speed; the rotation terminating mechanism 6A configured to regulate a motion of the steering wheel 3 input to the torque sensor 110, in terms of the rack end; and a steering control ECU (Electric Control Unit) 200 configured to control the driving of the electric motor 4.

The electric motor drive circuit 23 has switching elements, such as three-phase FET bridge circuit, and is configured to generate a square-wave voltage based on duty signals (DUTY U, DUTY V, DUTY W) from the steering control ECU 200 (see FIG. 7), to thereby drive the electric motor 4.

The electric motor drive circuit 23 also has a function to detect (measure) a three-phase electric motor current I (IU, IV, IW) using a Hall element (not shown).

The resolver 25 is configured to detect (measure) a rotation angle θm of the electric motor 4 and to output an angular signal θ, and examples include a sensor for detecting a change in magnetoresistance which is positioned in the vicinity of a magnetic rotor having a plurality of recess portions and projection portions arranged evenly along a circumference of the rotor.

The vehicle speed sensor Sv is configured to detect (measure) the vehicle speed as a pulse number per unit time, and to output a vehicle speed signal VS.

(Torque Sensor)

Figure 3:
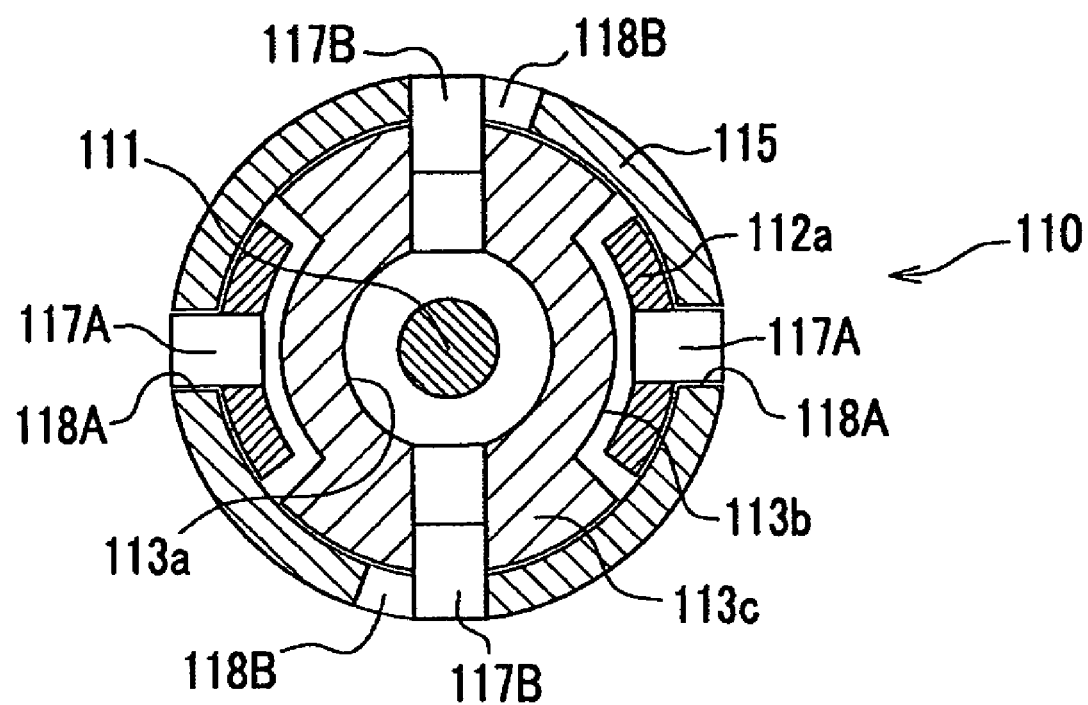
FIG. 3 is a cross section taken along a line A-A in FIG. 2, showing a detailed diagram of the torque sensor.

Next, with reference to FIGS. 2 to 4, a structure of the torque sensor will be explained. FIG. 3 is a cross section taken along a line A-A in FIG. 2. FIG. 4 illustrates displacements of an upper loose part, a lower loose part and a slider when a steering torque is applied, in which (a) shows a neutral state, (b) shows a state in which a left steering torque is applied and the pinion shaft 7 is rotated by approximately 30° from the neutral state, in a left-handed (anticlockwise) direction about the input shaft 3d, and (c) shows a state in which a right steering torque is applied and the pinion shaft 7 is rotated by approximately 30° from the neutral state, in a right-hand (clockwise) direction about the input shaft 3d.

The torque sensor 110 is configured to detect (measure) a magnitude and a direction of a steering torque Ts applied to the steering wheel 3 (see FIG. 1), and as shown in FIG. 2, it is assembled with the input shaft 3d and the pinion shaft 7, and contained together with the bearings 3e, 3f in a lid portion 13A, which is in a flanged connection with the upper portion of the rack housing portion 11A.

As shown in FIG. 2, the torque sensor 110 is supported by the bearings 3e, 3f and a bearing (not shown) coaxially provided between the input shaft 3d and the pinion shaft 7, in such a manner that the torque sensor 110 and the bearings are relatively rotatable to each other. The input shaft 3d and the pinion shaft 7 are connected through the torsion bar 111. The torque sensor 110 includes: an upper loose part 112 on a lower end side of the input shaft 3d; a lower loose part 113 on an upper end side of the pinion shaft 7; pins 117A, 117A and 117B, 117B (see FIG. 3) fixed to an outer periphery of the upper loose part 112 and an outer periphery of the lower loose part 113, respectively; a slider 115; and a first detection coil 114A and a second detection coil 114B.

As shown in FIG. 3, the upper loose part 112 has opposing loose pieces 112a, 112a. The lower loose part 113 is a thick-walled cylinder including: a hollow portion 113a at a center; thin circumferential portions 113b, 113b which are opposing thin side walls formed in the cylinder; and protruding circumferential portions 113c, 113c which are opposing thicker portions as the rest of the cylinder.

The upper loose part 112 and the lower loose part 113 are combined in such a manner that the loose piece 112a is overlaid on the thin circumferential portion 113b in a radial direction. Between an outer periphery of the thin circumferential portion 113b and an inner periphery of the loose piece 112a, a gap is formed, so that a rotation is allowed with a predetermined relative rotation angle, such as −5° to +5°. With respect to a relative rotation with a larger angle, an end portion in a rotational direction of the loose piece 112a and an end portion in a rotational direction of the protruding circumferential portion 113c are brought into contact with each other, and the torsion bar 111 is not further distorted.

It should be noted that a diameter (distance from the axial center) of the outer periphery of the loose piece 112a of the upper loose part 112 and a diameter (distance from the axial center) of the outer periphery of the protruding circumferential portions 113c of the lower loose part 113 are the same. Over the outer peripheries of the upper loose part 112 and the lower loose part 113, the slider 115 in a shape of a cylinder is slidably fitted. In the slider 115, opposing vertical slots 118A, 118A for inserting pins 117A, 117A are formed in an axial direction, and opposing oblique slots 118B, 118B for inserting pins 117B, 117B are formed. The torque sensor 110 is assembled by, first putting the torsion bar 111, the upper loose part 112 and the lower loose part 113 together, passing the pins 117A, 117A, 117B, 117B through the slots 118A, 118A and the oblique slots 118B, 118B, and press-fitting the pins into respective pin holes (not shown) formed in the upper loose part 112 and the lower loose part 113.

The slider 115 is made of a magnetic core material. A first detection coil 114A and a second detection coil 114B surrounded by a yoke material are fixed to an inner periphery of the lid portion 13A, in such a manner that they face to an outer periphery of the slider 115 and are arranged two-tiered.

Herein the pins 117A, 117A, the pins 117B, 117B, the slots 118A, 118A, the oblique slots 118B, 118B form a cam mechanism, and when the upper loose part 112 and the lower loose part 113 are distorted, as shown in FIG. 4, the slider 115 vertically moves in an axial direction, with the guidance along the slots 118A and the oblique slots 118B.

Figure 5:
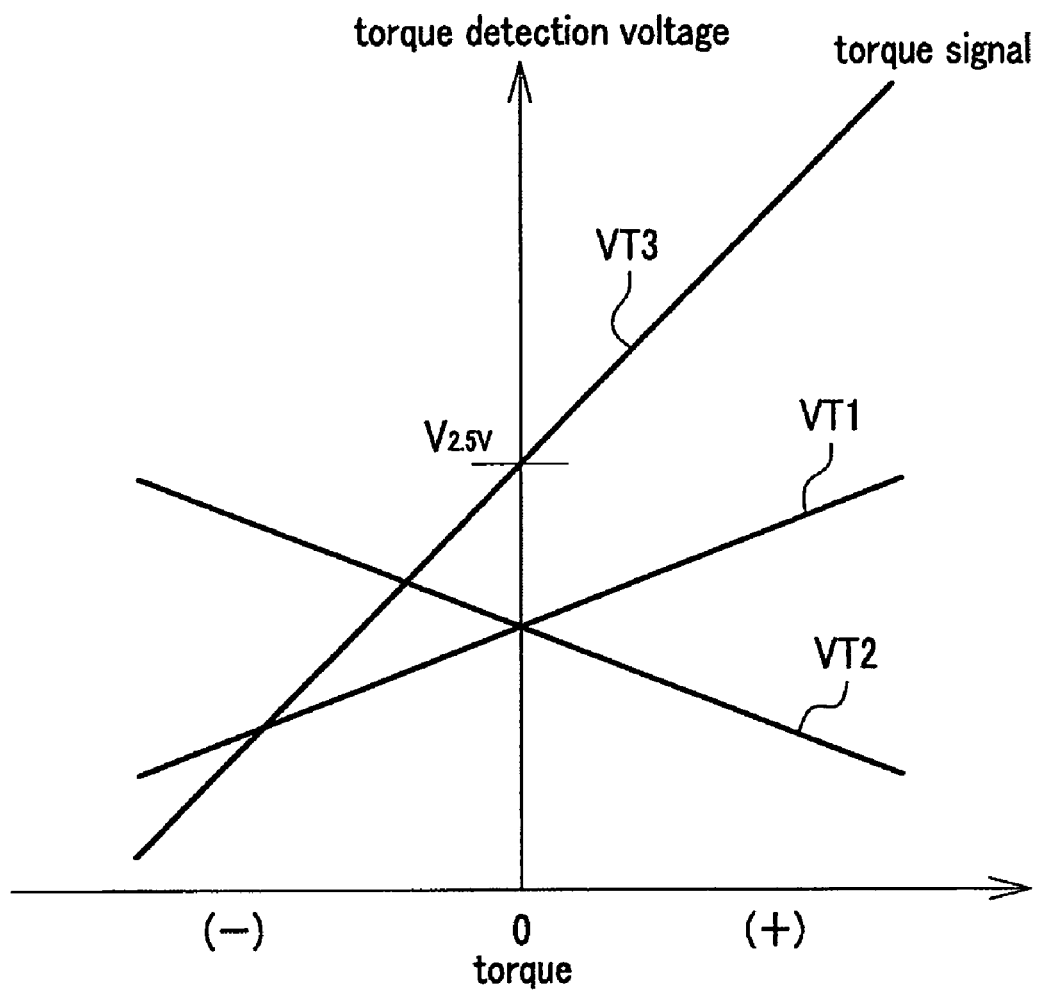
FIG. 5 is a graph illustrating voltage output signals VT1, VT2 from a torque sensor, as well as a torque detection voltage (torque signal) VT3 amplified by a differential amplifier.

Such a vertical displacement of the slider 115 made of magnetic core generates change in magnetic flux density around the first detection coil 114A and the second detection coil 114B, with which an inductance of one of the first detection coil 114A and the second detection coil 114B becomes large, while an inductance of the other becomes small. The first detection coil 114A and the second detection coil 114B output torque detection voltages VT1, VT2, respectively, as shown in FIG. 5.

The torque detection voltages VT1, VT2 from the detection coils 114A, 114B are amplified by the differential amplifier 21 (see FIG. 2), and output as a torque detection voltage (torque signal) VT3 to the steering control ECU 200 (see FIG. 1).

(Rotation Terminating Mechanism)

Figure 6C:
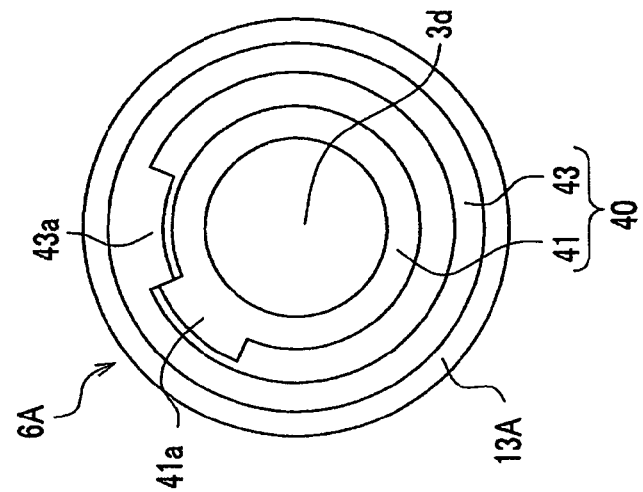
FIG. 6 shows schematic plane sections of a rotation terminating mechanism of the first embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).
Figure 6A:
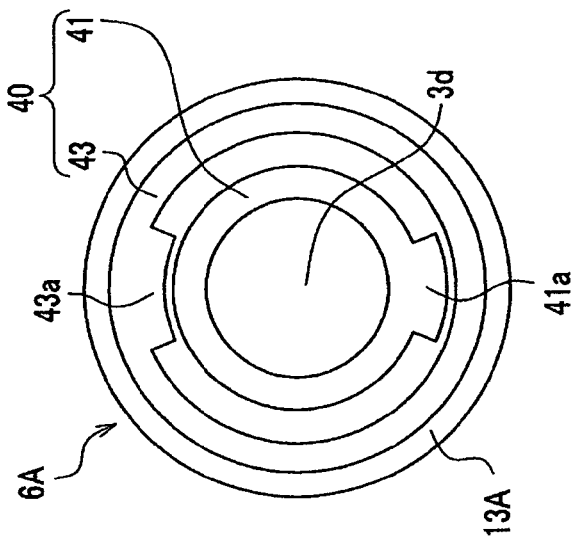
Figure 6B:
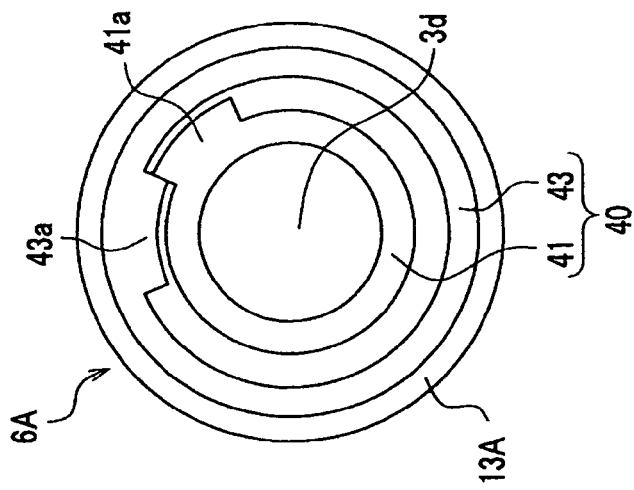

Next, with reference to FIG. 6, the rotation terminating mechanism 6A configured to limit the steering wheel 3 at a rack end angle where the maximum turning angle of the wheels is reached will be described. FIG. 6 shows schematic plane sections of a rotation terminating mechanism of the first embodiment, in which (a) is a diagram in a case where a steering wheel is at a neutral position relative to right and left rotational positions, (b) is a diagram in a case where the steering wheel is fully steered to the left (in a "left rack end"

state), and (c) is a diagram in a case where the steering wheel is fully steered to the right (in a "right rack end" state).

As shown in FIG. 1, the rotation terminating mechanism 6A is disposed on a steering wheel 3 side relative to the torque sensor 110 in an axial direction of the input shaft 3d, and as shown in FIG. 6, has a stopper 40 which includes: a rotary stopper 41 in a shape of an approximate cylinder, which is fixed to an outer periphery of the input shaft 3d and has a projection 41a outward protruding from an outer periphery of the rotary stopper 41 in a radial direction; and a fixed stopper 43 in a shape of an approximate cylinder, which is fixed to the inner periphery of the lid portion 13A and has a projection 43a inward protruding from an inner periphery of the fixed stopper 43 in a radial direction. On an inner periphery side of the fixed stopper 43, the rotary stopper 41 is rotatable approximately 180° to both the right and left in a rotational direction, as an allowable range of operation amount (allowable range of turning operation) of the steering wheel 3.

As shown in (a) of FIG. 6, in the case where the steering wheel 3 is at the neutral position, the projection 41a is positioned 180° opposite to the projection 43a.

In the "left rack end" state of the conventional structure where the rack shaft 8 is fully steered to the left and thus the rack end 8b and the housing end 11a are brought into contact with each other, as shown in (b), the projection 41a comes into contact with the projection 43a in an anticlockwise direction, and thus even when the steering wheel 3 is turned further to the left, further rotation or operating force is not transmitted to the torsion bar 111. When a reaction force of the load torque TL from the road surface is applied, a torque is detected (measured) by the torque sensor 110, but if not applied, no torque is detected. Especially in the present embodiment, the rack end 8b and the housing end 11a are provided for the purpose of positioning during assembly of the rack shaft 8, and are configured to have a room therebetween so as not to come into contact with each other, at the steering angle (operation amount) of the steering wheel 3 fully to the right and the left, which is limited by the rotation terminating mechanism 6A. Therefore, even when the rotation of the electric motor 4 undergoes overshoot, the device has a function of reducing the steering torque Ts detected (measured) by the torque sensor 110.

On the other hand, in the "right rack end" state of the conventional structure where the rack shaft 8 is fully steered to the right and thus the rack end 8b and the housing end 11a are brought into contact with each other, as shown in (c), the projection 41a comes into contact with the projection 43a in a clockwise direction, and thus even when the steering wheel 3 is turned further to the right, further rotation or operating force is not transmitted to the torsion bar 111. Like in the above-mentioned case where the rack shaft 8 is fully steered to the left, the rack end 8b and the housing end 11a are configured to have a room therebetween so as not to come into contact with each other. Therefore, even when the rotation of the electric motor 4 undergoes overshoot, the device has a function of reducing the steering torque Ts detected (measured) by the torque sensor 110.

It should be noted that, in (a), (b) and (c) of FIG. 6, illustrations are made in the case where a twist amount of the torsion bar 111 is small.

(Steering Control ECU)

Figure 7:
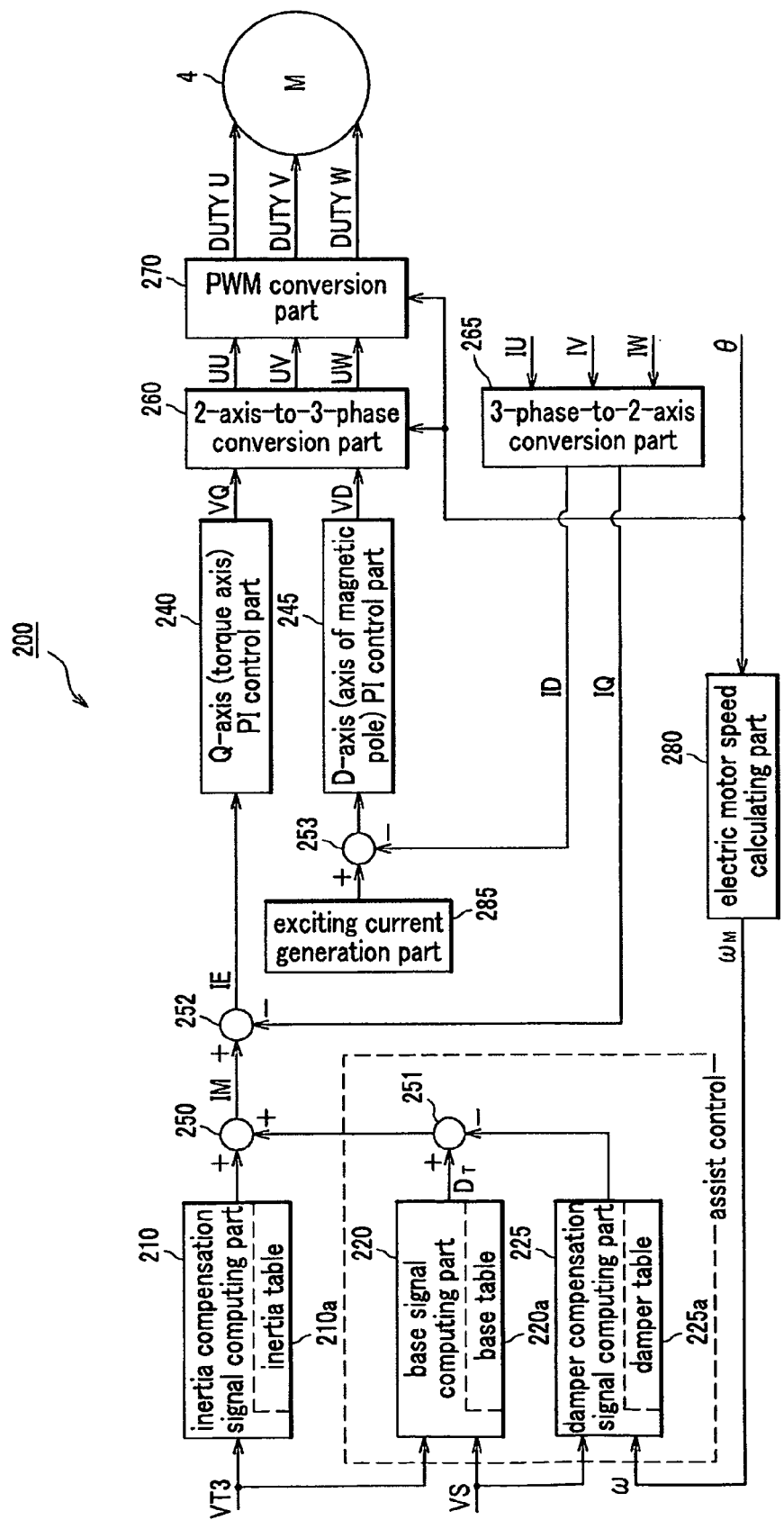
FIG. 7 is a function diagram of a steering control ECU.
Figure 8A:
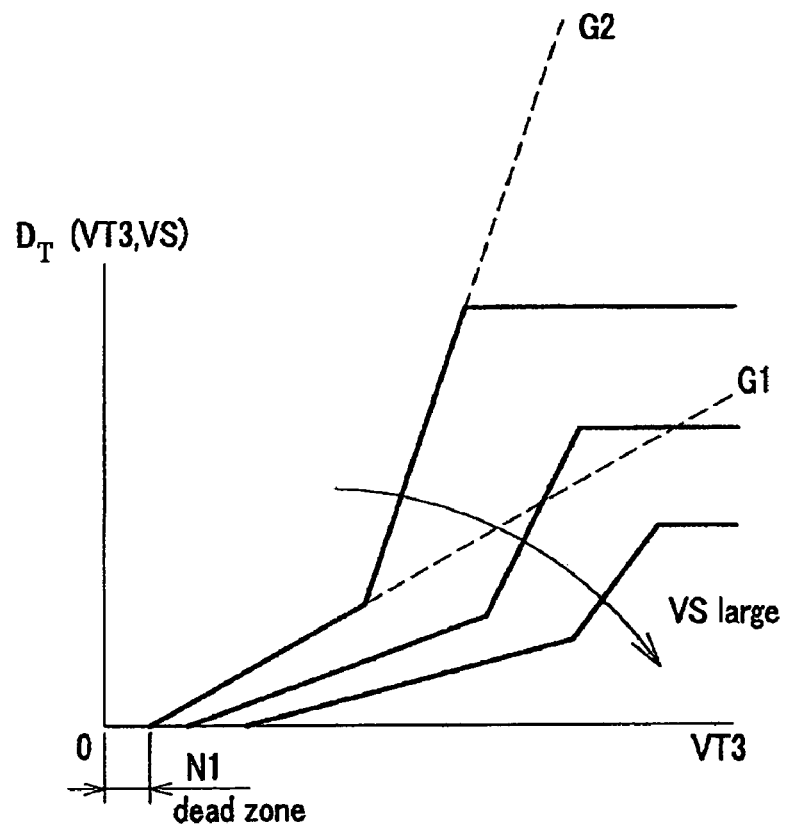
FIG. 8A is a data table showing a relationship in a base signal computing part, between a torque signal as input and a base signal as output.
Figure 8B:
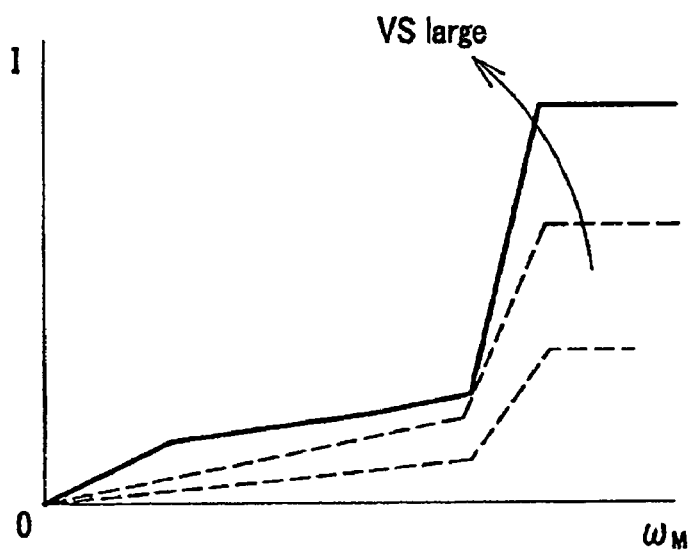
FIG. 8B is a data table showing a relationship in a damper compensation signal computing part, between a rotational speed of an electric motor as input and a compensation signal as output.

Next, with reference to FIGS. 7, 8A and 8B, the steering control ECU will be described. FIG. 7 is a function diagram of the steering control ECU, FIG. 8A is a data table showing a relationship in a base signal computing part, between a torque signal as input and a base signal as output, and FIG. 8B is a data table showing a relationship in a damper compensation signal computing part, between a rotational speed of an electric motor as input and a compensation signal as output.

The steering control ECU 200 includes a microcomputer with components, such as CPU (Central Processing Unit), ROM (Read Only Memory), RAM (Random Access Memory) (all not shown), programs and peripheral circuits and the like, and performs a function depicted in the function diagram of FIG. 7.

The steering control ECU 200 includes: a base signal computing part 220; an inertia compensation signal computing part 210; a damper compensation signal computing part 225; a Q-axis (torque axis) PI control part 240; a D-axis (axis of magnetic pole) PI control part 245; a 2-axis-to-3-phase conversion part 260; a PWM conversion part 270; a 3-phase-to-2-axis conversion part 265; an electric motor speed calculating part 280; and an exciting current generation part 285.

The 3-phase-to-2-axis conversion part 265 is configured to convert a three-phase current IU, IV, IW of the electric motor 4 detected by the electric motor drive circuit 23 into a two-axis current, including a D-axis which is an axis of magnetic pole of the rotor of the electric motor 4, and a Q-axis which is obtained by electrically rotating the D-axis by 90 degrees. A Q-axis current IQ is proportional to the torque $T_M$ generated at the electric motor 4, and a D-axis current ID is proportional to an exciting current. The electric motor speed calculating part 280 introduces a differential operator to an angular signal θ of the electric motor 4, to thereby generate an angular velocity signal $\omega_M$. The exciting current generation part 285 generates a target signal "0" for the exciting current of the electric motor 4, and if desired, field-weakening control can be performed by making the D-axis current substantially equal to the Q-axis current.

Based on the torque signal VT3 and the vehicle speed signal VS, the base signal computing part 220 generates a base signal $D_T$ to be used as a standard reference for a target signal IM of the output torque $T_M'$. The signal is generated from a base table 220a with reference to the torque signal VT3 and the vehicle speed signal VS, which table had been prepared in advance by experimental measurement or the like. FIG. 8A is a graph showing a function of the base signal $D_T$, stored in the base table 220a. In the base signal computing part 220, a dead zone N1 is provided where the base signal $D_T$ is set to zero when the value of the torque signal VT3 is small, and the base signal $D_T$ linearly increases along a gain G1 when the value of the torque signal VT3 is larger than the value in the dead zone N1. The base signal computing part 220 increases the output along a gain G2 at specific torque values, and when the torque value further increases, the output is made saturated.

In addition, a vehicle body in general has various road loads (road reactions) depending on the running speed thereof. Accordingly, the gain is adjusted based on the vehicle speed signal VS. The load is heaviest during a static steering (vehicle speed=0), and the load is relatively small at medium and low speeds. Therefore, when the vehicle speed VS becomes higher, the base signal computing part 220 provides the driver with road information with a larger manual steering zone, by making the gains (G1, G2) smaller and the dead zone N1 larger. In other words, in accordance with the increase of the vehicle speed VS, a steady responsive feeling is provided from the steering torque Ts. In this case, it is necessary that the inertia compensation be made also in the manual steering zone.

Referring to FIG. 7, the damper compensation signal computing part 225 is introduced for compensating a viscosity in the steering unit, and for providing a steering damper function for compensating convergence of steering wheel position when convergence decreases during high-speed driving, by reading a damper table 225a with reference to the angular velocity signal $\omega_M$.

FIG. 8B is a graph showing a characteristic function of the damper table 225a, in which the line is formed of a several linear sections and a compensation value I as a whole increases as the angular velocity $\omega_M$ of the electric motor 4 increases. The graph is also characterized in that the compensation value I rapidly increases when the angular velocity $\omega_M$ is in a specific range.

Moreover, as the vehicle speed signal VS becomes high, the angular velocity of the electric motor 4, i.e., the output torque $T_M{}'$ of the electric motor 4 in accordance with the speed of the steering wheel turn, is reduced by increasing the gains.

To put it another way, when the steering wheel 3 is turned away from the home position, a current to the electric motor 4 is reduced; when the steering wheel 3 is returned to the home position, a larger current is supplied to the electric motor 4. For example, when the steering wheel 3 is further turned away and the angular velocity $\omega_M$ becomes high, the angular velocity $\omega_M$ cannot be immediately reduced because of the interia in the electric motor 4. In order to prevent this phenomenon, the damper compensation signal computing part 225 increases the current supply to the electric motor 4, to thereby perform an inhibitory control of the angular velocity $\omega_M$ when the steering wheel 3 is resuming the home position.

To put it simply, when the steering wheel 3 is further turned away from the home position, as an angular velocity $\omega_M$ of the steering wheel 3 becomes high, a current to the electric motor 4 is reduced so as to make a steering feeling of the steering wheel 3 heavier; when the steering wheel 3 is resuming the home position, a current to the electric motor 4 is increased so as to make difficult for the steering wheel 3 to resume. Because of this steering damper effect, convergence of the steering wheel 3 is improved, to thereby stabilize the vehicle properties.

Referring to FIG. 7, an adder 251 is configured, when the steering wheel 3 is turned away from the home position, to subtract the output signal of the damper compensation signal computing part 225 from the output signal $D_T$ of the base signal computing part 220, and on the other hand, when the steering wheel 3 is returned to resume the home position, to add the output signal of the damper compensation signal computing part 225 to the output signal $D_T$. An adder 250 is configured to add the output signal from the adder 251 and the output signal from the inertia compensation signal computing part 210 and to output the output signal IM. It should be noted that a basic assist control is performed by a combination of the base signal computing part 220, the damper compensation signal computing part 225 and the adder 251.

The inertia compensation signal computing part 210 is configured to compensate an effect caused by the inertia in the steering unit, in which the torque signal VT3 is subjected to computation with reference to an inertia table 210a.

In addition, the inertia compensation signal computing part 210 compensates the lowering of the response caused by the inertia of the rotor of the electric motor 4. To put it another way, when the rotation direction of the electric motor 4 is made to be switched from forward to reverse or vice versa, it is difficult to immediately switch the direction since the inertia tends to maintain the rotational state. Accordingly, the inertia compensation signal computing part 210 controls the timing of switching the rotation direction of the electric motor 4, so as to synchronize the timing of switching the rotation direction of the electric motor 4 with that of the steering wheel 3. In this manner, the inertia compensation signal computing part 210 reduces a response lag in the steering, which may otherwise be caused by inertia, viscosity or the like in the steering unit, to thereby give an excellent steering feeling.

Further, the inertia compensation signal computing part 210 can practically impart satisfactory steering feeling relative to various steering properties which varies depending on vehicle characteristics, such as those specifically different among FF (Front engine Front wheel drive) vehicle, FR (Front engine Rear wheel drive) vehicle, RV (Recreation Vehicle) and sedan (or saloon) car, and vehicle states, such as vehicle speed, as well as road conditions.

The output signal IM of the adder 250 is a target signal for the Q-axis current which defines the torque of the electric motor 4 and an adder 252 is configured to subtract the Q-axis current IQ from the output signal IM and to generate a deviation signal IE. The Q-axis (torque axis) PI control part 240 is configured to perform a P (proportional) control and an I (integral) control so as to reduce the deviation signal IE. An adder 253 is configured to subtract the D-axis current ID from the output signal of the exciting current generation part 285. The D-axis (axis of magnetic pole) PI control part 245 is configured to perform a PI feedback control so as to reduce the output signal from the adder 253.

The 2-axis-to-3-phase conversion part 260 is configured to convert two-axis signal including an output signal VQ from the Q-axis (torque axis) PI control part 240 and an output signal VD from the D-axis (axis of magnetic pole) PI control part 245 into three-phase signal UU, UV, UW. The PWM conversion part 270 is configured to generate duty signals (DUTY U, DUTY V, DUTY W), which is an ON/OFF signal [PWM (Pulse Width Modulation) signal] having pulse widths proportional to the magnitude of the three-phase signal UU, UV, UW.

It should be noted that the angular signal θ of the electric motor 4 is input to the 2-axis-to-3-phase conversion part 260 and the PWM conversion part 270, and signals corresponding to the magnetic pole position of the rotor are output.

(Action and Effect of Rotation Terminating Mechanism)

Next, with reference to FIGS. 1, 6 and 9A-9C, action and effect of the rotation terminating mechanism 6A in the present embodiment will be described.

In FIG. 1, a case is assumed in which there is no rotation terminating mechanism 6A (in a case of the conventional electric power steering device). In the conventional electric power steering device, when the housing end 11a on a right (or left) end of the rack housing portion 11A and the corresponding rack end 8b of the rack shaft 8 are in contacting engagement with each other, and the steering wheel 3 is further turned to the right (or left), a larger load is applied from the pinion shaft 7 to the rack shaft 8, than a load from the front wheels 1L, 1R.

The reasons are as follows.

When the positional relationship between the rack shaft 8 and the rack housing portion 11A is not at a terminating end position, in other words, when the front wheels 1L, 1R are not turned fully to either the right or left, a relationship among a steering torque Ts, an assist amount $A_H$ and a pinion torque Tp is represented by the following equation (herein, a load torque from the front wheels 1L, 1R is represented as TL).

$$Ts + A_H = Tp = TL \tag{3}$$

However, when the front wheels 1L, 1R are turned fully to the right or left, and the rack end 8b and the housing end 11a are already brought into contact, and at the same time the driver puts the operating force on the steering wheel 3 (turns the steering wheel further away from the home position), the load torque TL from the front wheels 1L, 1R does not further increase, but the torsion bar 111 is further distorted. Accordingly, the steering torque Ts is detected (measured) as a larger value by the torque sensor 110, and the steering control ECU 200 outputs a command to the electric motor drive circuit 23, to increase a current value by the electric motor 4. With this increase of the assist amount $A_H$, as well as the increase of the steering torque Ts, a larger torque than the load torque TL is applied to the rack shaft 8 through the pinion gear 7a and the rack gear 8a.

$$Ts + A_H = Tp > TL \quad (4)$$

In this case, loads applied to the electric motor 4, the worm gear 5a, the worm wheel gear 5b, the pinion gear 7a, the rack gear 8a, the bearings 3e, 3f, 3g, the rack end 8b and the rack housing portion 11A become approximately 1.3 times higher than normal loads in the case where no rack end angle is reached.

A moment at which the rack end 8b and the housing end 11a come into contact with each other is considered. Herein, a rotational angular velocity of the electric motor 4 is represented as COM, and a rotational inertia moment is represented as Im. The electric motor 4 stores a kinetic energy EM represented by the following equation:

$$EM = (1/2) \cdot Im \cdot \omega_M^2 \quad (5)$$

This kinetic energy is absorbed by elastic deformation of the worm gear 5a, the worm wheel gear 5b, the pinion gear 7a, the rack gear 8a, the bearing 3e, 3f, 3g, the rack end 8b, the housing end 11a and the like, and a shock load in this state becomes approximately 1.5 times higher than a normal load in the case where no rack end angle is reached.

Because of these assist amount $A_H$, steering torque Ts and shock load, the loads applied to the electric motor 4, the worm gear 5a, the worm wheel gear 5b, the pinion gear 7a, the rack gear 8a, the bearings 3e, 3f, 3g, the rack end 8b and the rack housing portion 11A become approximately twice higher than normal loads. In order to ensure the durability of these components, the bearings and a module of the gears should be made larger, the rack housing portion 11A should be made thicker, a reinforcing rib should be introduced, and the like, leading to a problem of heavier components. With respect to electrical parts, the electric motor 4 may be burnt out because of overload.

On the other hand, according to the present embodiment, before the rack end 8b and the housing end 11a for positioning come into contact with each other, the projections 41a, 43a are already brought into contact with each other, so that the input shaft 3d is not further turned away from the home position in the rotation terminating mechanism 6A, and thus the operating force of further turning away of the steering wheel 3 is not transmitted to the torsion bar 111. Moreover, since the torsion bar 111 does not suffer distortion other than the distortion by the load torque TL, among the steering torque Ts, the assist amount $A_H$, the pinion torque Tp, and the load torque TL, the relationship as represented by the equation (3) is maintained, and further assist amount $A_H$ from the electric motor 4, which may otherwise be generated by turning further away of the steering wheel 3, is not generated. What is more, since the rack end 8b and housing end 11a for positioning has a room above the maximum turning angle of the wheels (rack end angle), even when the rotation of the electric motor 4 undergoes overshoot, the steering torque Ts detected (measured) by the torque sensor 110 is reduced, and the assist amount $A_H$ is reduced. The result is represented as the following equation (6).

$$Ts + A_H = Tp < TL \quad (6)$$

Next, with reference to FIGS. 9A to 9C, behaviors of the turning angle of the wheels and the torque signal VT3 will be described, in a case where the steering wheel 3 is turned by a large amount away from the home position to the rack end angle.

Figure 9A:
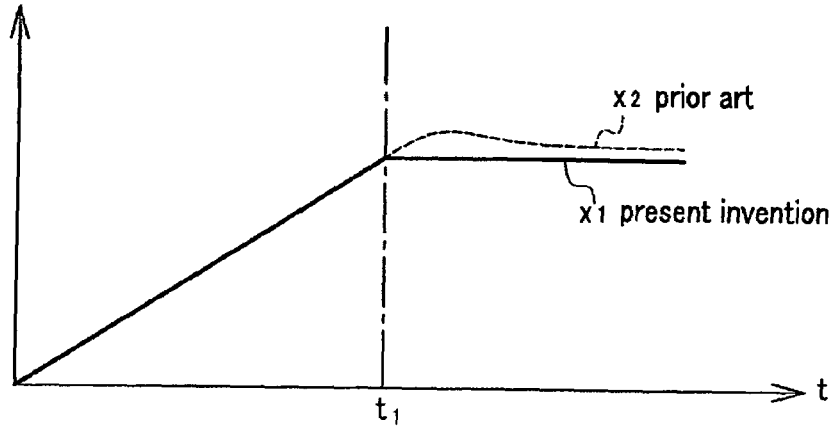
FIG. 9A is a graph showing changes over time of operation amount of a steering wheel.
Figure 9B:
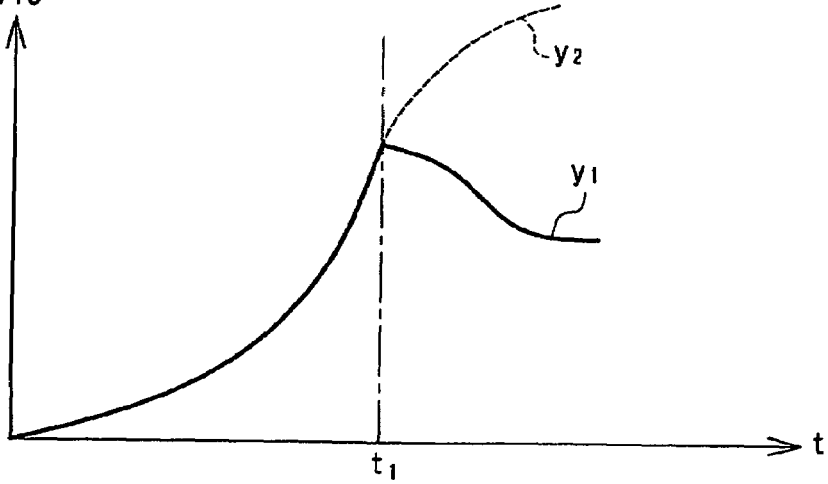
FIG. 9B is a graph showing changes over time of a torque signal VT3 output from the torque sensor.
Figure 9C:
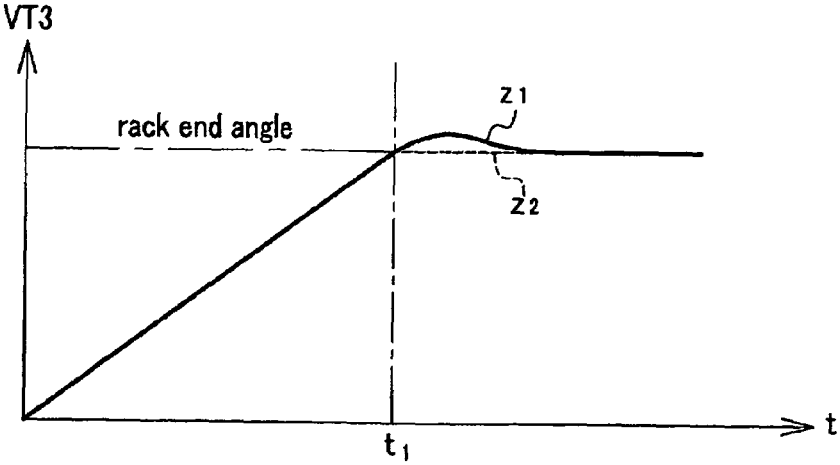
FIG. 9C is a graph showing changes over time in an actual turning angle of front wheels.

FIG. 9A is a graph showing changes over time of operation amount of the steering wheel, FIG. 9B is a graph showing changes over time of a torque signal VT3 output from a torque sensor, and FIG. 9C is a graph showing changes over time in an actual turning angle of front wheels.

When the steering wheel 3 is turned by a large amount to a position near the rack end angle, as shown in a curve x1 of the present embodiment in FIG. 9A, the torsion bar 111 is distorted before the rack end 8b and the housing end 11a come into contact with each other, and at a time t1, the rotation terminating mechanism 6A blocks the increase in the operation amount of the steering wheel 3.

As shown in a curve y1 of FIG. 9B, the torque signal continues to increase until the time t1, due to the large change in the operation amount of the steering wheel 3, but at the time t1, the increase in the torque signal stops since the increase in the operation amount of the steering wheel 3 becomes zero. As shown in a curve z1 in FIG. 9C, the turning angle of the front wheels 1L, 1R undergoes overshoot a little more than the rack end angle. Due to this overshoot, the torque signal VT3 is reduced as shown in the curve y1 of FIG. 9B. This overshoot is resulting from a kinetic energy by the inertia moment of the electric motor 4.

Compared with this, in the prior art, as shown in a curve z2 of FIG. 9C, since the rack end 8b and the housing end 11a are brought into contact with each other, a change (increase) in the turning angle of the wheels is hindered. However, as in a curve x2 of FIG. 9A, the operation amount of the steering wheel 3 increases due to the inertia moment of the steering wheel 3 caused by the operation of the driver, and eventually converges.

In this case, as shown in a curve y2 of FIG. 9B, at the rack end angle, the torque signal VT3 temporarily rises to a large extent, and at the same time, the kinetic energy by the inertia moment of the electric motor 4 generates an impact force in the gears (such as the worm gear 5a, the worm wheel gear 5b, the rack gear 8a and the pinion gear 7a).

Therefore, in the conventional technique, as shown in the curve z2 of FIG. 9C, the rack end 8b and the housing end 11a collides with each other at the rack end angle, and at the same time, as shown in FIG. 9B, the torque signal VT3 further increases, and impact of the kinetic energy by the electric motor 4 is affected.

According to the present embodiment, as described above, even when the steering wheel 3 at a position near the rack end angle is further turned away, or is turned by a large amount away from the home position to reach the rack end angle, the collision between the rack end 8b and the housing end 11a can be prevented, and therefore, the pinion torque Tp can be reduced as the same level or less of the pinion torque Tp in a normal state in which the rack end angle is not reached.

Accordingly, loads assumed upon designing the electric motor 4, the worm gear 5a, the worm wheel gear 5b, the pinion gear 7a, the rack gear 8a, the bearings 3e, 3f, 3g, the rack end 8b and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle.

In the conventional device, in order to prevent the electric motor 4 being burnt out when the steering wheel in the rack end state is further turned away from the home position, a room should be set in the current capacity, but in the present invention, there is no such necessity and thus the weight of the electric motor 4 can be reduced.

<<Modified Version of Rotation Terminating Mechanism>>

The rotation terminating mechanism of the present invention is not limited to the above-mentioned embodiment, and for example, the following various modifications are possible.

(First Modified Version of First Embodiment)

A rotation terminating mechanism according to a first modified version of the first embodiment will be described with reference to FIG. 10. FIG. 10 shows schematic plane sections of a rotation terminating mechanism of the first modified version of the first embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).

As shown in FIG. 10, a rotation terminating mechanism 6B is formed of: an inner shaft 51 connected to the input shaft 3*d*; a rotary stopper 53 disposed outside of the inner shaft 51; and a fixed stopper 54 disposed outside of the rotary stopper 53.

On the inner shaft 51, an external gear 51*a* is provided, and the rotary stopper (ring gear) 53 in a shape of an approximate cylinder having an internal gear 53*a* formed in an inner periphery, which gear engages with the external gear 51*a*, is disposed eccentrically relative to the inner shaft 51. A ratio in the number of teeth between the external gear 51*a* and the internal gear 53*a* is approximately 1:3.

The rotary stopper 53 has a projection (first projection) 53*b* outward protruding from a portion of an outer periphery thereof in a radial direction. The fixed stopper 54 in a shape of an approximate cylinder, which is fixed to the inner periphery of the lid portion 13A and has a projection (second projection) 54*a* inward protruding from a portion of an inner periphery of the fixed stopper 54 in a radial direction, is provided coaxially with the rotary stopper 53. The rotary stopper 53 and the fixed stopper 54 form a stopper 50.

The external gear 51*a* and the internal gear 53*a* together form a deceleration mechanism 55, and when the steering wheel 3 is rotated by approximately 540° from the neutral state in a right-handed (clockwise) or left-handed (anticlockwise) direction, the rotary stopper 53 is rotated by approximately 180° in the corresponding direction, and the projection 53*a* is brought into contact with the projection 54*a* in a rotational direction.

Though it is not shown in the drawings, in the rotary stopper 53, an entire outer periphery of the upper end portion, as well as an entire outer periphery of the lower end portion, is a cylindrical periphery. In the fixed stopper 54, an entire inner periphery of the upper end portion, as well as an entire inner periphery of the lower end portion, is a cylindrical periphery with a small radius. The outer cylindrical peripheries of the rotary stopper 53 and the respective inner cylindrical peripheries of the fixed stopper 54 form sliding bearings, and this structure allows the rotary stopper 53 to rotate.

As shown in (a) of FIG. 10, in the case where the steering wheel 3 is at a neutral position, the projection 53*a* is positioned 180° opposite to the projection 54*a*.

In the "left rack end" state where the rack shaft 8 is fully steered to the left and thus the rack end 8*b* and the housing end 11*a* are brought into contact with each other, as shown in (b), the projection 53*a* comes into contact with the projection 54*a* in an anticlockwise direction, and thus even when the steering wheel 3 is turned further to the left, further rotation or operating force is not transmitted to the torsion bar 111. On the other hand, in the "right rack end" state where the rack shaft 8 is fully steered to the right and thus the rack end 8*b* and the housing end 11*a* are brought into contact with each other, as shown in (c), the projection 53*a* comes into contact with the projection 54*a* in a clockwise direction, and thus even when the steering wheel 3 is turned further to the right, further rotation or operating force is not transmitted to the torsion bar 111.

According to the rotation terminating mechanism 6B of the present modified version, as compared with the rotation terminating mechanism 6A of the first embodiment, the allowable range of operation amount (allowable range of turning operation) of the steering wheel 3 to the rack end angle becomes as large as 540° in both the right-handed and left-handed (clockwise and anticlockwise) directions. Therefore, the operation amount of the steering wheel 3 can be conveniently made as those of the common vehicle. In addition, by exchanging the rotary stopper (ring gear) 53 with another having a different number of teeth, the allowable range of operation amount can be set to, for example, 450°, 600° or the like. In other words, the operation amount of the steering wheel corresponding to the rack end angle can be altered, which allows an introduction of the steering device to various types of vehicles.

Also in the present modified version, like in the first embodiment, even when the rack shaft 8 is already in the rack end state and the driver turns the steering wheel 3 further away from the home position, the rotation terminating mechanism 6B blocks the turning operation, and the operating force of further turning away is not transmitted to the torsion bar 111. Among the steering torque Ts, the assist amount $A_H$, the pinion torque Tp, and the load torque TL, the relationship as represented by the equations (3) and (6) is maintained, and the assist amount $A_H$ and the steering torque Ts from the electric motor 4, which may otherwise be generated by turning further away of the steering wheel 3, are not generated.

In addition, even when the steering wheel 3 is turned by a large amount to reach the rack end, the collision can be prevented, since the rack end 8*b* and the housing end 11*a* do not limit the rack end angle, unlike the conventional technique.

Accordingly, loads assumed upon designing the electric motor 4, the worm gear 5*a*, the worm wheel gear 5*b*, the pinion gear 7*a*, the rack gear 8*a*, the bearings 3*e*, 3*f*, 3*g*, the rack end 8*b*, and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle. In addition, a room is created in the current capacity and thus the weight of the electric motor 4 can be reduced.

It should be noted that, the deceleration mechanism 55 according to the first modified version in which the external gear 51*a* and the internal gear 53*a* are used in combination is illustrated as one for reducing the operation amount of the steering wheel 3 of approximately 540° in both the right and left directions, to the rotation angle of the rotary stopper 53 of approximately 180° in the corresponding right or left direction. However, any deceleration mechanism may be used.

(Second Modified Version of First Embodiment)

Figure 11:
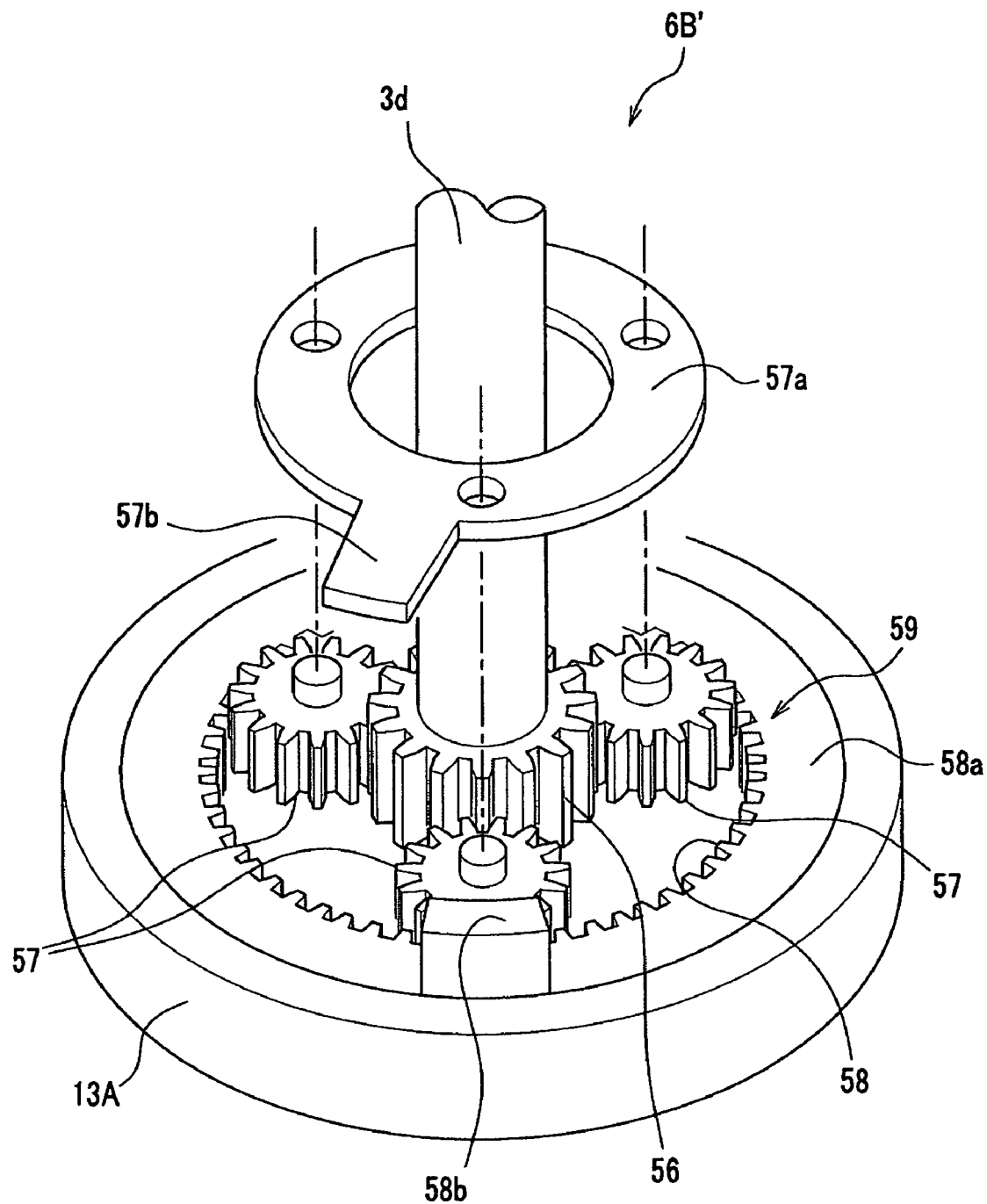
FIG. 11 is a schematic perspective view showing a rotation terminating mechanism of a second modified version of the first embodiment using a planetary gear reducer unit.

Next, with reference to FIG. 11, a rotation terminating mechanism 6B' according to a second modified version of the first embodiment will be described. FIG. 11 is a schematic perspective view showing a rotation terminating mechanism of the second modified version of the first embodiment using a planetary gear reducer unit. As shown in FIG. 11, a planetary gear reducer unit 59 may include: a sun gear 56; planetary gears 57 each configured to engage with the sun gear 56 and revolve around the sun gear 56; an outer ring gear 58 having internal tooth configured to engage with the planetary gear 57; and a planetary carrier 57a configured to connect shafts of the planetary gears 57.

In this case, the input shaft 3d drives the sun gear 56. The planetary carrier 57a corresponds to the rotary stopper 53 and for example has a projection (first projection) 57b outward protruding in a radial direction. The outer ring gear 58 corresponds to the fixed stopper 54 and is fixed to the lid portion 13A and has a projection (second projection) 58b which protrudes from a portion of an outer rim side of an end face 58a of the outer ring gear 58 in an axial direction (in such a manner that the projection 58b does not interfere with the planetary gear 57), and is configured to engage with the projection 57b. When a ratio of the number of teeth of the sun gear (a) to the number of teeth of the outer ring gear (c) is set to 1:2, the rotation angle of the planetary carrier 57a relative to the rotation angle of the sun gear 56 can be reduced to ⅓, and as in the first modified version of the first embodiment, the rotation angle of the planetary carrier 57a (rotary stopper 53) is reduced to approximately 180° in both the right and left directions, as compared with the allowable range of operation amount (allowable range of turning operation) of the steering wheel 3 of approximately 540° in both the right and left directions.

It should be noted that, in FIG. 11, the projection 57b is outward protruding from the planetary carrier 57a in a radial direction, but the present invention is not limited to this embodiment, and alternatively, the projection 57b may be protruding in an axial direction (upward in FIG. 11), and at the same time the projection 58b may be inward protruding from the end face 58a of the outer ring gear 58 in a radial direction.

Alternatively, the projection 58b may be inward protruding from the inner periphery of the lid portion 13A in a radial direction, so as to engage with the projection 57b.

By using the planetary gear reducer unit as the deceleration mechanism 55, the rotation terminating mechanism 6B' can be made coaxial with a center axis of the lid portion 13A, and thus the size of the rotation terminating mechanism 6B' in a radial direction can be reduced. In addition, since a load on the projection 57b when the projection 57b is brought into contact with the projection 58b is shared by a plurality of the planetary gears 57 through the planetary carrier 57a, the rotation terminating mechanism 6B' can tolerate a larger load as compared with the case of the rotation terminating mechanism 6B of the second modified version, and thus can be made compact by that amount.

(Third Modified Version of First Embodiment)

Figure 12B:
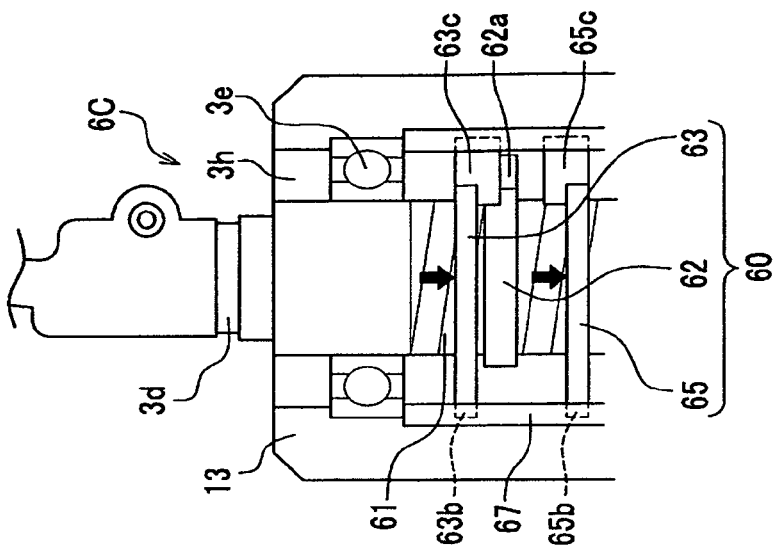
FIG. 12 shows schematic plane sections of a rotation terminating mechanism of a third modified version of the first embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).
Figure 12A:
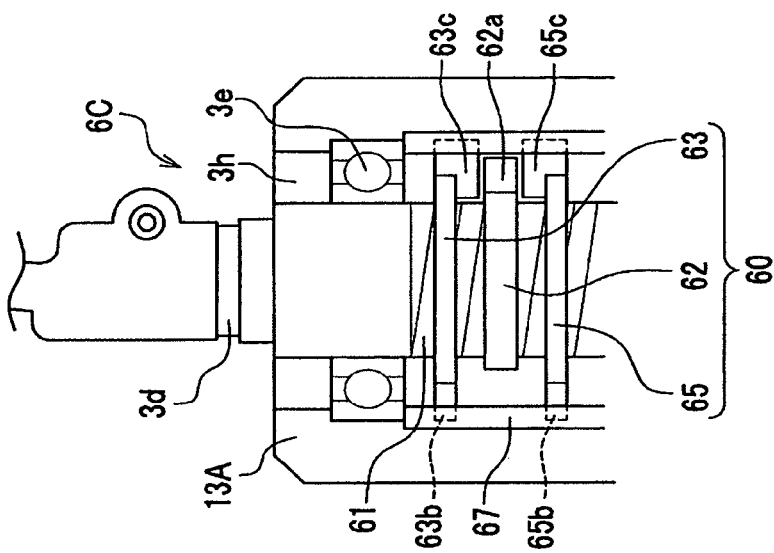
Figure 12C:
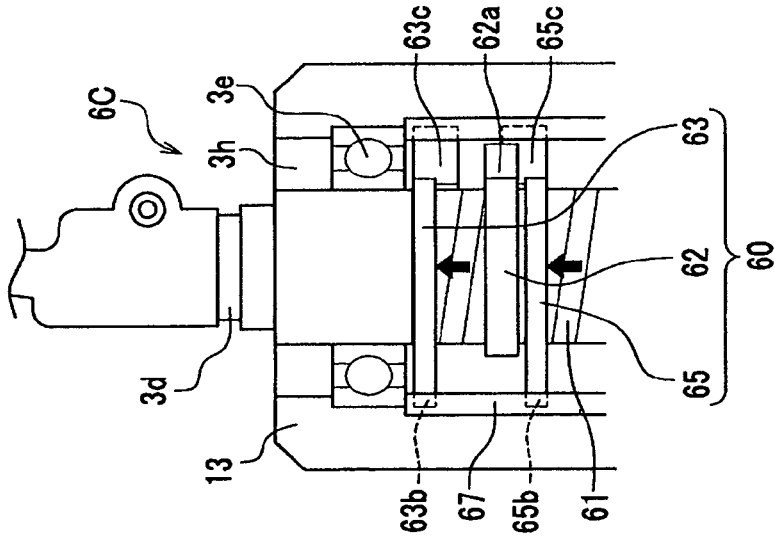
Figure 13A:
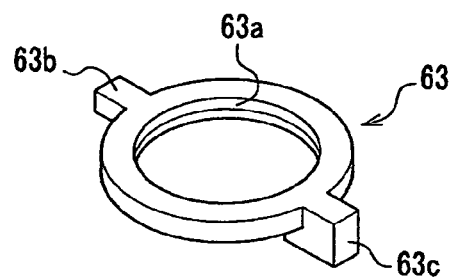
Figure 13B:
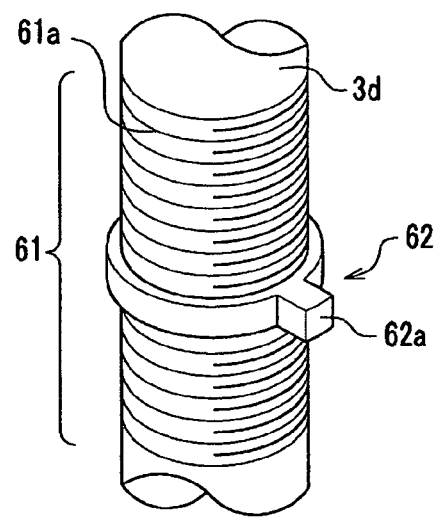
Figure 13C:
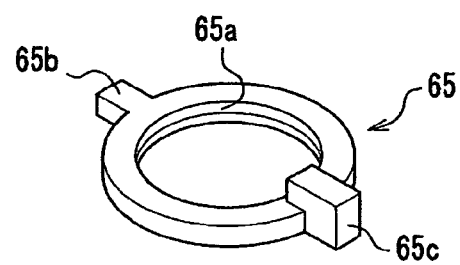
Figure 13D:
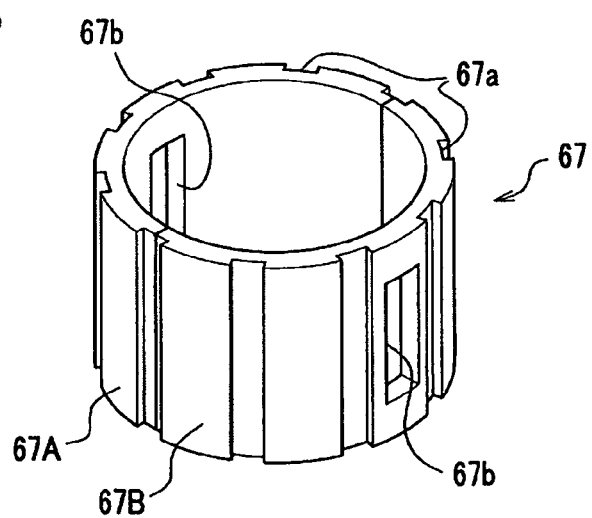

Next, with reference to FIGS. 12 and 13A to 13D, a rotation terminating mechanism 6C according to a third modified version of the first embodiment will be described. FIG. 12 shows schematic plane sections of a rotation terminating mechanism of the third modified version of the first embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state). FIGS. 13A to 13D are perspective views separately showing components of the rotation terminating mechanism of the third modified version of the first embodiment, in which: FIG. 13A is a perspective exterior view of an upper stopper; FIG. 13B is a perspective exterior view of a rotary stopper fixed to a thread portion; FIG. 13C is a perspective exterior view of a lower stopper; and FIG. 13D is a perspective exterior view of a guide member.

As shown in FIGS. 13A to 13D, the rotation terminating mechanism 6C is formed of: a thread portion 61 having an external thread 61a formed in an outer periphery of the input shaft 3d; a rotary stopper (first stopper) 62 in a shape of a cylinder welded to the thread portion 61 at the center thereof in an axial direction; an upper stopper (second stopper) 63 and a lower stopper (third stopper) 65 disposed above and below, respectively, the rotary stopper 62; and a guide member 67.

The rotary stopper 62 is in a shape of an approximate cylinder as shown in FIG. 13B, and has a projection (first projection) 62a outward protruding from a portion of an outer periphery thereof in a radial direction.

It should be noted that, a distance from the rotational axis of the rotary stopper 62 to the outermost end of the projection 62a in the radial direction is made shorter than a distance from the axis to the inner periphery of the guide member 67.

Each of the upper stopper 63 and lower stopper 65 is in a shape of an approximate cylinder as shown in FIGS. 13A and 13C. The upper stopper 63 includes: an internal thread 63a which is formed in an inner periphery and engages with the external thread 61a; and a guide portion 63b and a projection (second projection) 63c, both outward protruding from a portion of an outer periphery of the upper stopper 63 and arranged 180° opposite to each other. The guide portion 63b and the projection 63c fit in their respective guide slits 67b of the guide member 67 each extending in an axial direction, which will be described later. Along with the right or left rotation of the thread portion 61, the upper stopper 63 is guided by the guide slit 67b and moves up or down in the axial direction.

The guide portion 63b has the same thickness as that of the cylindrical main body of the upper stopper 63 and is flush with the cylindrical main body. On the other hand, the projection 63c is downward protruding in the axial direction, as shown in FIG. 13A.

The lower stopper 65 is the same as the upper stopper 63 as an article, and is assembled simply upside down in the device, and has the same structure as that of the upper stopper 63. A projection 65c of the lower stopper 65 corresponds to a third projection.

The rotary stopper 62, the upper stopper 63 and the lower stopper 65 form the stopper 60.

The guide member 67 includes members 67A, 67B each having a shape of a half of a cylinder divided in the axial direction and forming a cylinder as a combination. Each of the members 67A, 67B has serrations 67a which extend in the axial direction and are formed in the outer periphery, and has the guide slit 67b which extends in the axial direction and is formed in the center position of the outer periphery. The serrations 67a are configured to engage with the serration (not shown) formed in the inner periphery of the lid portion 13A, so as to fix the guide member 67 and prohibit the movement of the guide member 67 in a circumferential direction in the lid portion 13A.

Since the guide member 67 has a separable structure, by making the outer diameter of both ends of the thread portion 61 in the radial direction smaller than the inner diameter of the peak of the internal threads 63a, 65a of the stoppers 63, 65, the upper stopper 63 and the lower stopper 65 are first assembled with the thread portion 61 from the bottom and the top thereof, respectively, and then the guide portions 63b, 65b and the projections 63c, 65c are fitted to the respective guide slits 67b of the members 67A, 67B, to thereby assemble the guide member 67 as one unit. Finally, the rotation termination mechanism is fixed by press-fitting the guide member 67 into the inner periphery of the lid portion 13A.

The external thread 61a, the internal thread 63a and the internal thread 65a together form a deceleration mechanism, and when the steering wheel 3 is rotated by approximately 540° from the neutral state in a right-handed (clockwise) or left-handed (anticlockwise) direction, the rotary stopper 62 is rotated by approximately 540° in the corresponding direction, and the upper stopper 63 and the lower stopper 65 move by the same distance in an axial direction. For example, the upper stopper 63 and the lower stopper 65 moves upward when the steering wheel 3 is steered to the left and downward when steered to the right. When the rotary stopper 62 is rotated approximately 540° to either the right or left, the projection 62a comes into contact with the projection 65c in the case of the steering to the left, and with the projection 63c in the case of the steering to the right, in a rotational direction.

To put it another way, like in the first modified version of the first embodiment, the allowable range of operation amount (allowable range of turning operation) of the steering wheel 3 of approximately 540° in both the right and left rotational direction is ensured. In addition, without increasing the profile of the rotation terminating mechanism 6C, the allowable range of operation amount can be set to, for example, 2 turns (720°) to both the right and left, and thus the device can be applied to vehicles other than automobile.

In FIG. 12, (a) shows that, when the steering wheel 3 is at a neutral position, the projection 62a is positioned at a center in an axial direction relative to the projections 63c, 65c. (b) shows that, in the "left rack end" state where the rack shaft 8 is fully steered to the left and thus the rack end 8b and the housing end 11a are brought into contact with each other, the projection 62a comes into contact with the projection 65c in an anticlockwise direction (seen from above), and thus even when the steering wheel 3 is turned further to the left, further rotation or operating force is not transmitted to the torsion bar 111. On the other hand, (c) shows that, in the "right rack end" state where the rack shaft 8 is fully steered to the right and thus the rack end 8b and the housing end 11a are brought into contact with each other, the projection 62a comes into contact with the projection 63c in a clockwise direction (seen from above), and thus even when the steering wheel 3 is turned further to the right, further rotation or operating force is not transmitted to the torsion bar 111.

Also in the present modified version, like in the first embodiment, even when the rack shaft 8 is already in the rack end state and the driver turns the steering wheel 3 further away from the home position, the rotation terminating mechanism 6C blocks the turning operation, and the operating force of further turning away is not transmitted to the torsion bar 111. Among the steering torque Ts, the assist amount $A_H$, the pinion torque Tp, and the load torque TL, the relationship as represented by the equations (3) and (6) is maintained, and the assist amount $A_H$ and the steering torque Ts from the electric motor 4, which may otherwise be generated by turning further away of the steering wheel 3, are not generated.

In addition, even then the steering wheel 3 is turned by a large amount to reach the rack end, the collision can be prevented, since the rack end 8b and the housing end 11a do not limit the rack end angle, unlike the conventional technique.

Accordingly, like in the first embodiment, loads assumed upon designing the electric motor 4, the worm gear 5a, the worm wheel gear 5b, the pinion gear 7a, the rack gear 8a, the bearings 3e, 3f, 3g, the rack end 8b and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle. In addition, a room is created in the current capacity and thus the weight of the electric motor 4 can be reduced.

The electric power steering device 100A in the first embodiment is configured to perform assist drive of the pinion shaft 7 through the deceleration mechanism 5A by the electric motor 4. However, the present invention is not limited by this embodiment. The torque sensor described above is one configured to convert a torsion angle of the torsion bar 111 into a vertical displacement amount of the slider 115, detect (measure) the displacement amount by the detection coils 114A, 114B, and output a torque signal VT3. Alternatively, any torque sensor may be used.

Second Embodiment

Next, with reference to FIG. 14, an electric power steering device according to the second embodiment of the present invention will be described.

FIG. 14 is a configuration diagram of an electric power steering device according to the second embodiment of the present invention. An electric power steering device 100B of the present embodiment is configured to perform assist driving of the rack shaft 8 by the electric motor 4, through a ball screw 5c.

The present embodiment is different from the first embodiment in that the electric motor 4 drives the deceleration mechanism (auxiliary torque transmission mechanism) 5B formed of the worm gear 5a and the worm wheel gear 5b, and the ball screw 5c, to thereby directly convert a rotational motion of the ball screw 5c to a linear motion of the rack shaft 8, unlike the first embodiment in which the electric motor 4 drives the pinion shaft 7 through the worm gear 5a and the worm wheel gear 5b.

In addition, the present embodiment is different from the first embodiment in that a torque sensor 120 with magnetostrictive film is used, instead of the torque sensor 110.

Components which are the same as those illustrated in the first embodiment are designated with the same reference characters, and thus a duplicate description is omitted.

Since the position of the deceleration mechanism (auxiliary torque transmission mechanism) 5B is different from that of the first embodiment, shapes of a rack housing portion 11B and a lid portion 13B of a steering gear box 10B of the present embodiment are different from those of the corresponding component of the first embodiment, though the functions are substantially the same.

The torque sensor 120 has the same structure as that disclosed in FIGS. 1 and 2 of Japanese unexamined patent publication No. 2006-322952, and the outer periphery of the input shaft 3d is covered with a magnetostrictive material showing a positive magnetostriction constant, such as Fe—Ni or Fe—Cr material with a predetermined film thickness, such as 30 micrometer or less by plating, vapor deposition or the like, in a whole circumferential direction. The films are formed at two positions with a predetermined interval in an axial direction, as a first magnetostrictive film 121A and a second magnetostrictive film 121B. In addition, the film is formed in such a manner that first the film is heated by high-frequency induction heating and cooled to room temperature while a predetermined torque is applied to the input shaft 3*d*, and then the torque is removed, in order to create magnetic anisotropy in opposite directions in these films. Due to this property, even when the torsion torque is not applied to the magnetostrictive films 121A, 121B, the tensile stress and tensile distortion are always put, and hysteresis in inverse magnetostriction property becomes small. In addition, unlike the torque sensor 110 of the first embodiment, the electric power steering device of the present embodiment does not have the torsion bar 111 and thus distortion is not generated. Therefore, the steering angle of the steering wheel 3 corresponds to the turning angle of the wheels of the front wheels 1L, 1R, without distortion difference. As a result, a range of the turning angle of the wheels corresponding to the allowable range of operation amount determined by the rotation terminating mechanism 6 becomes substantially large.

Then, an exciting coil (not shown) of the torque sensor 120 is placed with a common minute gap from the magnetostrictive films 121A, 121B, and a first detection coil 124A is disposed corresponding to the first magnetostrictive film 121A and a second detection coil 124B is disposed corresponding to the second magnetostrictive film 121B, with a minute gap at positions 90° away from the exciting coil in an circumferential direction.

In the torque sensor 120, when a torque is applied to the input shaft 3*d*, the torque is also applied to the magnetostrictive films 121A, 121B where inverse magnetostriction effect is generated in accordance with the applied torque. When an alternating voltage (exciting voltage) with high-frequency wave is supplied from an exciting voltage supply source (not shown) to the exciting coil, a change in a magnetic field due to an inverse magnetostriction effect based on a torque applied to the magnetostrictive films 121A, 121B can be detected as a change in impedance or induction voltage, by the detection coils 124A, 124B. In this case, other than the torsion torque of the input shaft 3*d*, the tensile stress is always applied to the magnetostrictive films 121A, 121B, the hysteresis becomes small, and from this change in impedance or induction voltage, the torque applied to the input shaft 3*d* can be detected (measured).

The signal voltage VT1, VT2 from the detection coils 124A, 124B, respectively, are amplified by the differential amplifier 21, and output as a torque signal VT3 to the steering control ECU 200.

Also in the present embodiment, the rotation terminating mechanism 6 is disposed on a steering wheel 3 side relative to the torque sensor 120 in an axial direction of the input shaft 3*d*.

It should be noted that, in FIG. 14, the rotation terminating mechanism 6 is illustrated as one representing the above-mentioned rotation terminating mechanisms 6A, 6B, 6B', 6C, and any of the rotation terminating mechanisms 6A, 6B, 6B', 6C can be used.

Also in the present embodiment, like in the first embodiment and the modified version thereof, even when the rack shaft 8 is already in the rack end state and the driver turns the steering wheel 3 further away from the home position, the rotation terminating mechanism 6 blocks the turning opera-tion, and the operating force of further turning away is not transmitted to the magnetostrictive films 121A, 121B of the torque sensor 120. Among the steering torque Ts, the assist amount $A_H$, the pinion torque Tp, and the load torque TL, the relationship as represented by the equations (3) and (6) is maintained, and the assist amount $A_H$ and the steering torque Ts from the electric motor 4, which may otherwise be generated by turning further away of the steering wheel 3, are not generated.

In addition, even then the steering wheel 3 is turned by a large amount to reach the rack end, the collision can be prevented, since the rack end 8*b* and the housing end 11*a* do not limit the rack end angle, unlike the conventional technique.

Accordingly, loads assumed upon designing the electric motor 4, the worm gear 5*a*, the worm wheel gear 5*b*, the pinion gear 7*a*, the rack gear 8*a*, the bearings 3*e*, 3*f*, 3*g*, the rack end 8*b*, the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle. In addition, a room is created in the current capacity and thus the weight of the electric motor 4 can be reduced.

Third Embodiment

Next, with reference to FIG. 15, an electric power steering device according to a third embodiment of the present invention will be described.

Figure 15:
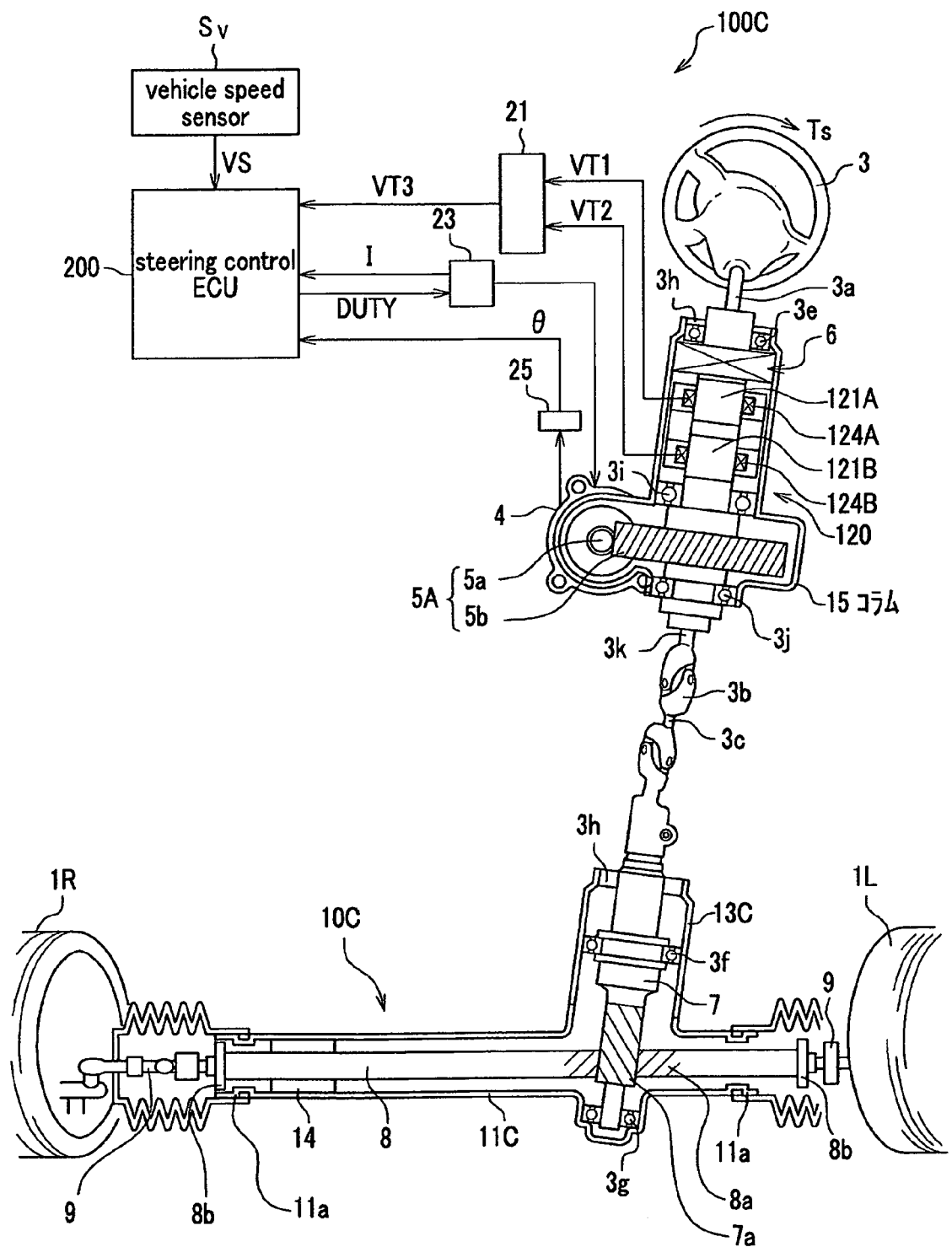
FIG. 15 is a configuration diagram of an electric power steering device according to a third embodiment of the present invention.

FIG. 15 is a configuration diagram of an electric power steering device according to the third embodiment of the present invention. An electric power steering device 100C of the present embodiment is configured to perform assist driving of the steering wheel shaft 3*a* by the electric motor 4, through the worm gear 5*a* and worm wheel gear 5*b*.

The present embodiment is different from the first embodiment in that the electric motor 4 drives the steering wheel shaft 3*a* through the deceleration mechanism (auxiliary torque transmission mechanism) 5A formed of the worm gear 5*a* and the worm wheel gear 5*b*, unlike the first embodiment in which the electric motor 4 drives the pinion shaft 7 through the worm gear 5*a* and the worm wheel gear 5*b*.

In addition, the present embodiment is different from the first embodiment in that a torque sensor 120 with magnetostrictive film is used, instead of the torque sensor 110.

As shown in FIG. 15, in the electric power steering device 100C, a column housing 15 containing the steering wheel shaft 3*a* of the steering wheel 3, and the pinion shaft 7 upward extending from a lid portion 13C of a steering gear box 10C are connected through a shaft 3*c* and two universal joints 3*b*.

The column housing 15 contains: the bearing 3*e* below a seal 3*h* provided on the upper end of the column housing 15; and below the bearing 3*e*, the rotation terminating mechanism 6, the torque sensor 120, a bearing 3*i*, the worm wheel gear 5*b* and a bearing 3*j* in this order. An output shaft 3*k*, which is a lower end of the steering wheel shaft 3*a* downward extending from a lower end of the column housing 15, is connected to the universal joint 3*b*. On a lower end of the pinion shaft 7, there is provided a pinion gear 7*a*, which is configured to engage with a rack gear 8*a* of a rack shaft 8 which can reciprocate in a vehicle width direction. To respective ends of the rack shaft 8, the left front wheel 1L and the right front wheel 1R are connected through tie rods 9, 9.

Components which are the same as those illustrated in the first and second embodiments are designated with the same reference characters, and thus a duplicate description is omitted.

Since the position of the deceleration mechanism (auxiliary torque transmission mechanism) 5A is different from that of the first embodiment, shapes of a rack housing portion 11C and the lid portion 13C of the steering gear box 10C of the present embodiment are different from those of the corresponding component of the first embodiment, though the functions are substantially the same. However, the rotation terminating mechanism 6 is not provided in the lid portion 13C, and thus the retention mechanism of the rotation terminating mechanism 6 as in the first and second embodiments is not necessary.

In addition, the torque sensor 120 of the present embodiment has substantially the same structure as that of the torque sensor 120 in the second embodiment, except that the torque sensor 120 is contained in the column housing 15, the first magnetostrictive film 121A and the second magnetostrictive film 121B are formed on an outer periphery of the steering wheel shaft 3a, and an exciting coil (not shown) and the detection coils 124A, 124B are placed with a minute gap from the magnetostrictive films 121A, 121B.

Also in the present embodiment, the rotation terminating mechanism 6 is disposed on a steering wheel 3 side relative to the torque sensor 120 in an axial direction of the steering wheel shaft 3a.

It should be noted that, in FIG. 15, the rotation terminating mechanism 6 is illustrated as one representing the above-mentioned rotation terminating mechanisms 6A, 6B, 6B', 6C, and any of the rotation terminating mechanism 6A, 6B, 6B', 6C can be used.

According to the present embodiment, like in the first embodiment and the modified versions thereof, even when the rack shaft 8 is already in the rack end state and the driver turns the steering wheel 3 further away from the home position, the rotation terminating mechanism 6 blocks the turning operation, and the operating force of further turning away is not transmitted to the magnetostrictive films 121A, 121B of the torque sensor 120. Among the steering torque Ts, the assist amount $A_H$, the pinion torque Tp, and the load torque TL, the relationship as represented by the equations (3) and (6) is maintained, and the assist amount $A_H$ and the steering torque Ts from the electric motor 4, which may otherwise be generated by turning further away of the steering wheel 3, are not generated.

In addition, even then the steering wheel 3 is turned by a large amount to reach the rack end, the collision can be prevented, since the rack end 8b and the housing end 11a do not limit the rack end angle, unlike the conventional technique.

Especially, since the rotation terminating mechanism 6 is provided near the steering wheel 3, the centering of the steering wheel shaft 3a of the steering wheel 3 with the rotation terminating mechanism 6 is facilitated.

Accordingly, loads assumed upon designing the electric motor 4, the worm gear 5a, the worm wheel gear 5b, the pinion gear 7a, the rack gear 8a, the bearings 3e, 3f, 3g, the rack end 8b, the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle. In addition, a room is created in the current capacity and thus the weight of the electric motor 4 can be reduced.

Fourth Embodiment

Figure 16:
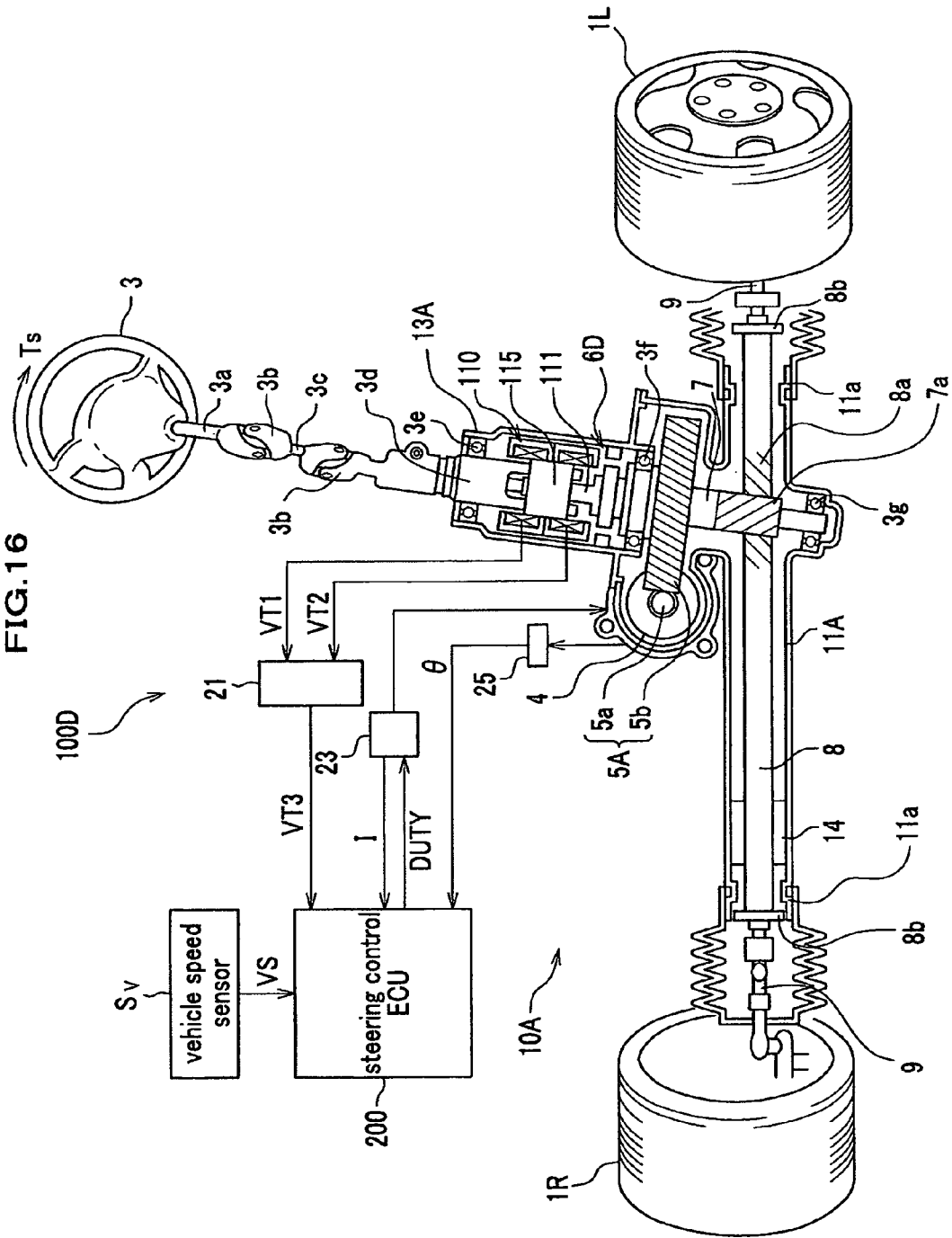
FIG. 16 is a configuration diagram of an electric power steering device according to a fourth embodiment of the present invention.
Figure 17:
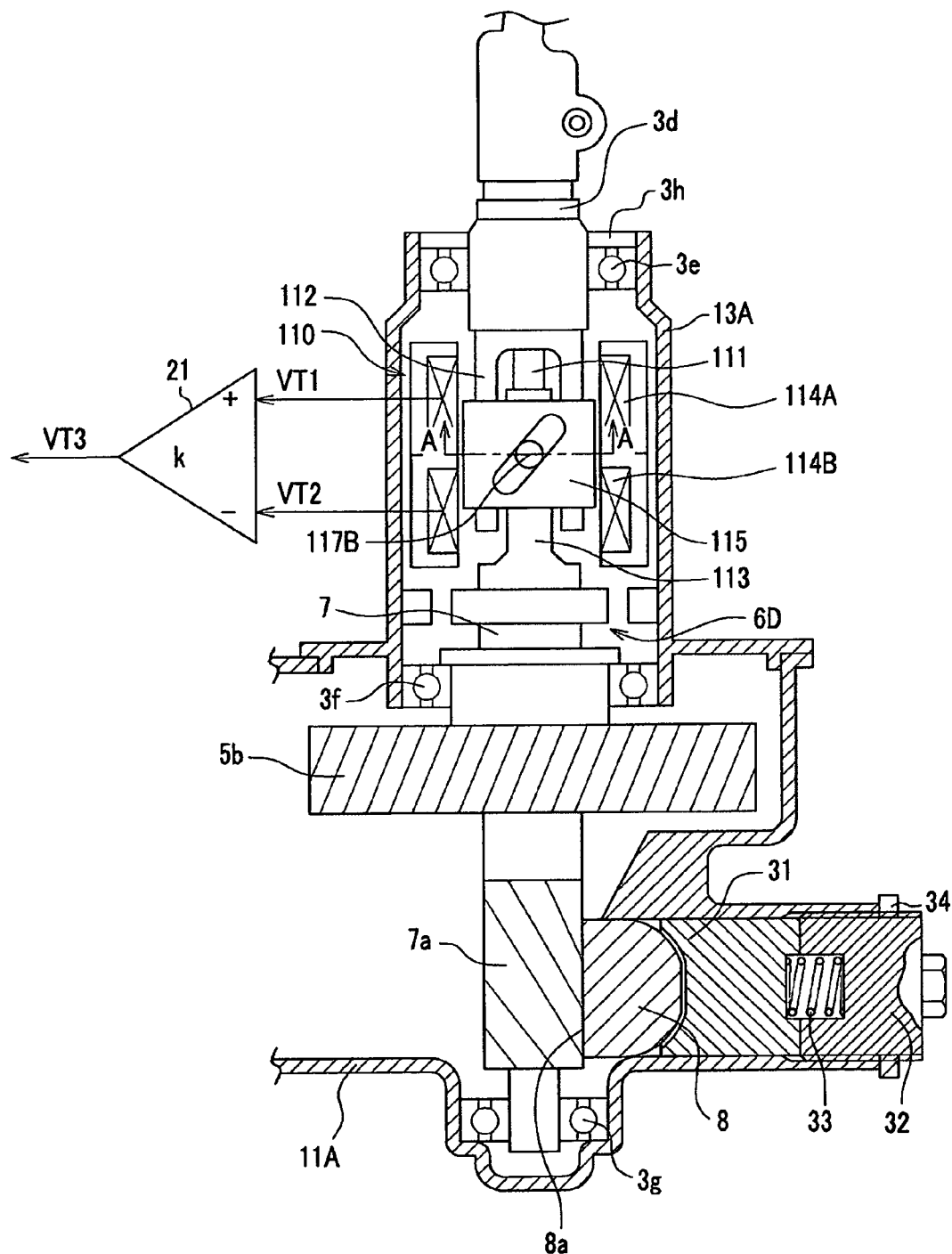
FIG. 17 is a side view showing portions around a torque sensor and a pinion gear in a steering gear box of FIG. 16.

With reference to FIGS. 16 to 20A-20C, a fourth embodiment of the present invention will be described. As shown in FIGS. 16 to 18, an electric power steering device 100D of the present embodiment has substantially the same structure as that of the electric power steering device 100A of the first embodiment (see FIGS. 1, 2 and 4), except that the position of the rotation terminating mechanism is different. Components which are the same as those illustrated in the first embodiment are designated with the same reference characters, and thus a duplicate description is omitted.

As shown in FIGS. 16 and 17, a rotation terminating mechanism 6D is disposed between the torque sensor 110 and the worm wheel gear 5b, in an axial direction of the input shaft 3d.

As shown in (a) of FIG. 19, in the case where the steering wheel 3 is at the neutral position, the projection 41a is positioned 180° opposite to the projection 43a.

In the "left rack end" state of the rack end angle where the rack shaft 8 is fully steered to the left, as shown in (b), the projection 41a comes into contact with the projection 43a in an anticlockwise direction, and thus the steering wheel 3 cannot be turned further to the left.

On the other hand, in the "right rack end" state of the rack end angle where the rack shaft 8 is fully steered to the right, as shown in (c), the projection 41a comes into contact with the projection 43a in a clockwise direction, and thus the steering wheel 3 cannot be turned further to the right.

(Action and Effect of Rotation Terminating Mechanism)

Next, with reference to FIGS. 16, 19 and 20A-20C, action and effect of the rotation terminating mechanism 6D in the present embodiment will be described.

In FIG. 16, a case is assumed in which there is no rotation terminating mechanism 6D (in a case of the conventional electric power steering device). In the conventional electric power steering device, when the housing end 11a on a right (or left) end of the rack housing portion 11A and the corresponding rack end 8b of the rack shaft 8 are in contacting engagement with each other, and the steering wheel 3 is further turned to the right (or left), a larger load is applied from the pinion shaft 7 to the rack shaft 8, than a load from the front wheels 1L, 1R.

The reasons are as follows.

When the positional relationship between the rack shaft 8 and the rack housing portion 11A is not at a terminating end position, in other words, when the front wheels 1L, 1R are not turned fully to either the right or left, a relationship among a steering torque Ts, an assist amount $A_H$ and a pinion torque Tp is represented by the following equation (herein, a load torque from the front wheels 1L, 1R is represented as TL).

$$Ts + A_H = Tp = TL \quad (3)'$$

A moment at which the rack end 8b and the housing end 11a come into contact with each other is considered. Herein, a rotational angular velocity of the electric motor 4 is represented as $\omega_M$, and a rotational inertia moment is represented as Im. The electric motor 4 stores a kinetic energy EM represented by the following equation.

$$EM = (1/2) \cdot Im \cdot \omega_M^2 \quad (4)'$$

The kinetic energy is absorbed by elastic deformation of the worm gear 5a, the worm wheel gear 5b, the pinion gear 7a, the rack gear 8a, the bearings 3e, 3f, 3g, the rack end 8b, the housing end 11a and the like, and overload in this state becomes approximately 1.5 times higher than a normal load in the case where no rack end angle is reached.

Because of these assist amount $A_H$, steering torque Ts and overload, the loads applied to the electric motor 4, the worm gear 5a, the worm wheel gear 5b, the pinion gear 7a, the rack gear 8a, the bearings 3e, 3f, 3g, the rack end 8b and the rack housing portion 11A become approximately 1.5 times higher than normal loads. In order to ensure the durability of these components, the bearings and a module of the gears should be made larger, the rack housing portion 11A should be made thicker, a reinforcing rib should be introduced, and the like, leading to a problem of heavier components.

On the other hand, according to the present embodiment, before the rack end 8b and the housing end 11a for positioning come into contact with each other, the projections 41a, 43a are already brought into contact with each other, so that the pinion shaft 7 is not further turned away from the home position in the rotation terminating mechanism 6D. Accordingly, an impact force by the inertia moment (kinetic energy) of the electric motor 4 is absorbed by the contact between the projection 41a and the projection 43a of the rotation terminating mechanism 6D and is never transmitted to the pinion gear 7a, the rack gear 8a, the rack shaft 8, the rack end 8b, the housing end 11a and the like through the pinion shaft 7. Furthermore, since the rotation terminating mechanism 6D is disposed on a torque sensor side (upstream side) of the deceleration mechanism (auxiliary torque transmission mechanism) 5A, the auxiliary torque of the electric motor 4 does not affect on the rotation terminating mechanism 6D, and as compared with a case where the rotation terminating mechanism 6D is disposed on a rack-and-pinion gears side (downstream side) of the deceleration mechanism (auxiliary torque transmission mechanism) 5A, the rotation terminating mechanism 6D, specifically the stopper 40, can be made compact. As a result, the stopper 40, the rotation terminating mechanism 6D and thus the electric power steering device 100D can be made compact.

Next, with reference to FIGS. 20A to 20C, behaviors of the turning angle of the wheels and the torque signal VT3 will be described, in a case where the steering wheel 3 is turned by a large amount away from the home position to the rack end angle.

Figure 20A:
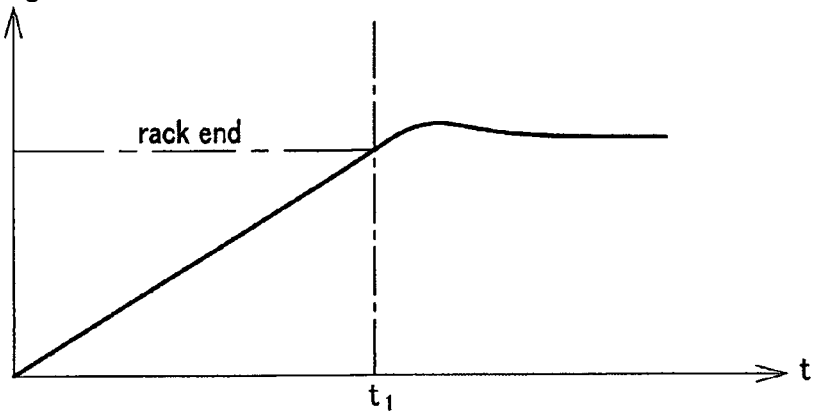
FIG. 20A is a graph showing changes over time of operation amount of a steering wheel.
Figure 20B:
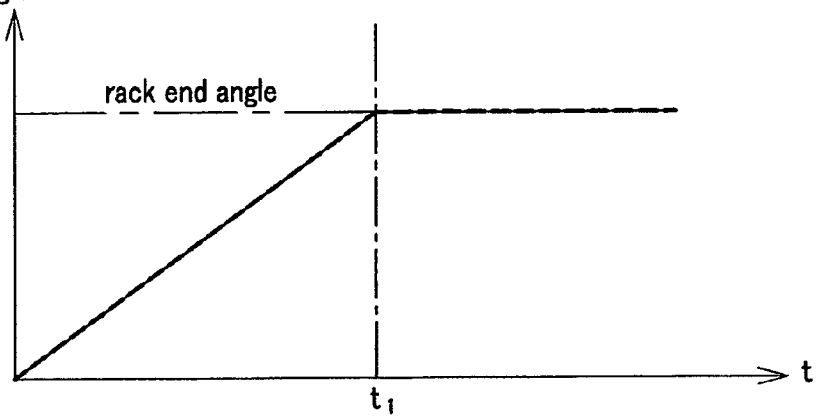
FIG. 20B is a graph showing changes over time of rotation angle of an electric motor and turning angle of front wheels, overlapped each other.
Figure 20C:
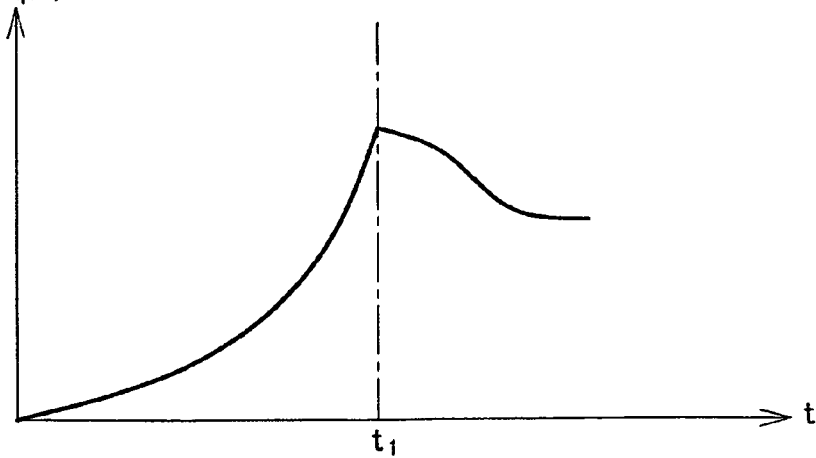
FIG. 20C is a graph showing changes over time in wheel turning force (torque) of front wheels.

FIG. 20A is a graph showing changes over time of operation amount of the steering wheel, FIG. 20B is a graph showing changes over time of rotation angle of an electric motor (solid line) and turning angle of front wheels (dotted line), overlapped each other, and FIG. 20C is a graph showing changes over time in wheel turning force (torque) of front wheels.

When the steering wheel 3 is turned by a large amount to the right or left "rack end" state, as shown in FIG. 20A, the torsion bar 111 is distorted, and therefore, the operation amount of the steering wheel 3 continues to increase even when reached the rack end at the time t1, and then the steering amount converges after exceeding the rack end state. The converging occurs because the projections 41a, 43a of the rotation terminating mechanism 6D are brought into contact with each other.

As shown in FIG. 20B, the rotation angle (solid line) of the electric motor 4 and the turning angle of front wheels (dotted line) continue to increase until the time t1, due to the large change in the operation amount of the steering wheel 3, but at the time t1, the projections 41a, 43a of the rotation terminating mechanism 6D are brought into contact with each other, since the rotation angle of the electric motor 4 and the turning angle of front wheels reach the rack end angle. Therefore, after the time t1, the rotation angle of the electric motor 4 and the turning angle of front wheels become constant at the rack end angle without increasing, such as overshoot, regardless of the time t.

As shown in FIG. 20C, the wheel turning force (torque) of the front wheels 1L, 1R increases until the time t1, but after the time t1, since the projections 41a, 43a of the rotation terminating mechanism 6D are brought into contact with each other, a wheel turning force (torque) exceeding the wheel turning force (torque) at the time t1 is never generated, and the generation of the overload can be prevented. Then, the rack-and-pinion gears never suffer the effect of the inertia moment of the electric motor 4, such as an impact force.

According to the present embodiment, as described above, even when the steering wheel 3 at a position near the rack end angle is further turned away, or is turned by a large amount away from the home position to reach the rack end angle, the overload generated in the pinion gear 7a, the rack gear 8a, the rack shaft 8, the rack end 8b, the housing end 11a, and the rack housing portion 11A can be prevented, and thus the pinion torque Tp actually transmitted to the pinion gear 7a and rack gear 8a can be reduced to the same level or less of the pinion torque Tp in a normal state in which the rack end angle is not reached.

Accordingly, loads (overload) assumed upon designing the pinion gear 7a, the rack gear 8a, the bearings 3e, 3f, 3g, the rack end 8b and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle. <<Modified Version of Rotation Terminating Mechanism>>

The rotation terminating mechanism of the present invention is not limited to the above-mentioned embodiment, and for example, the following various modifications are possible.

(First Modified Version of Fourth Embodiment)

Figure 21C:
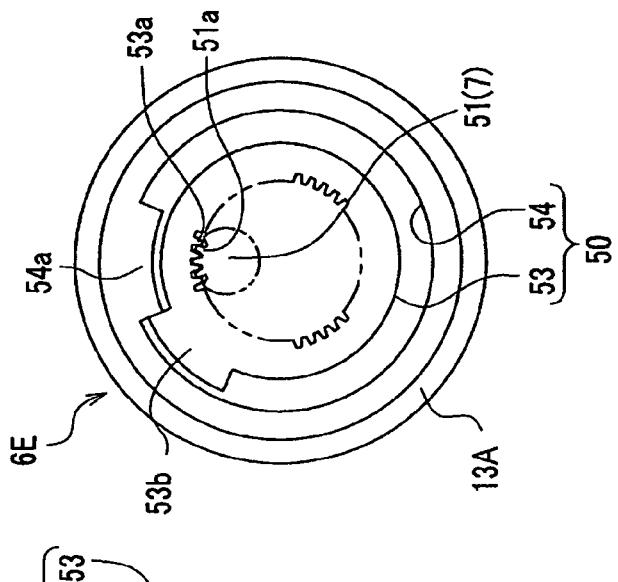
FIG. 21 shows schematic plane sections of a rotation terminating mechanism of a first modified version of the fourth embodiment, in which (a) is a diagram in a case where a steering wheel is at a neutral position relative to right and left rotational positions, (b) is a diagram in a case where the steering wheel is fully steered to the left (in a "left rack end" state), and (c) is a diagram in a case where the steering wheel is fully steered to the right (in a "right rack end" state).
Figure 21A:
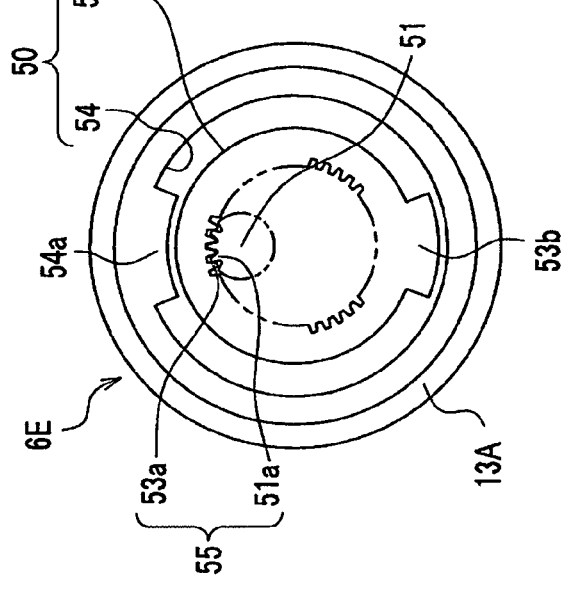
Figure 21B:
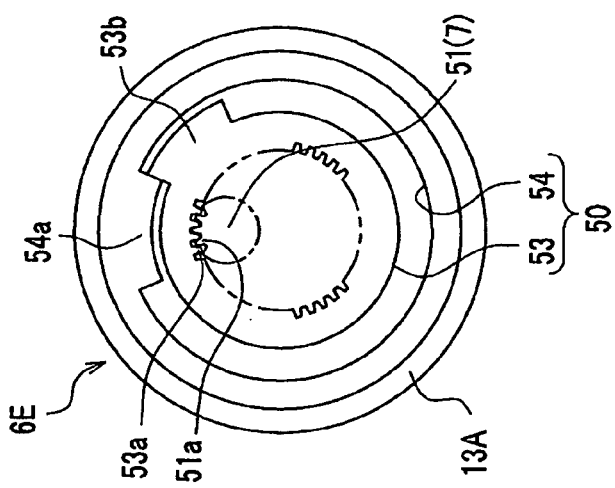

As shown in FIG. 21, a rotation terminating mechanism 6E is formed of: the inner shaft 51 as a part of the pinion shaft 7 (specifically called so in this rotation terminating mechanism 6E); the rotary stopper 53 disposed outside of the inner shaft 51; and the fixed stopper 54 disposed outside of the rotary stopper 53. In other words, the present embodiment has substantially the same structure as that of the first modified version of the first embodiment, except that the position of the rotation terminating mechanism is different and thus the input shaft 3d (see FIG. 10) is replaced with the pinion shaft 7 in the drawings. Components which are the same as those illustrated in the first modified version of the first embodiment are designated with the same reference characters, and thus a duplicate description is omitted.

As shown in (a) of FIG. 21, in the case where the steering wheel 3 is at a neutral position, the projection 53a is positioned 180° opposite to the projection 54a.

In the "left rack end" state where the rack shaft 8 is fully steered to the left and thus the rack end 8b and the housing end 11a are brought into contact with each other, as shown in (b), the projection 53a comes into contact with the projection 54a in an anticlockwise direction, and thus the steering wheel 3 cannot be turned further to the left. On the other hand, in the "right rack end" state where the rack shaft 8 is fully steered to the right and thus the rack end 8b and the housing end 11a are brought into contact with each other, as shown in (c), the projection 53a comes into contact with the projection 54a in a clockwise direction, and thus the steering wheel 3 cannot be turned further to the right.

According to the rotation terminating mechanism 6E of the present modified version, as compared with the rotation terminating mechanism 6D of the fourth embodiment, the allowable range of operation amount (allowable range of turning operation) of the steering wheel 3 to the rack end angle becomes as large as 540° in both the right-handed and left-handed (clockwise and anticlockwise) directions. Therefore, the operation amount of the steering wheel 3 can be conveniently made as those of the common vehicle. In addition by exchanging the rotary stopper (ring gear) 53 with another having a different number of teeth, the allowable range of operation amount can be set to, for example, 450°, 600° or the like. In other words, the operation amount of the steering wheel corresponding to the rack end angle can be altered, which allows an introduction of the steering device to various types of vehicles.

Also in the present modified version, like in the fourth embodiment, even when the rack shaft 8 is already in the rack end state and the driver turns the steering wheel 3 further away from the home position, the projections 53b and 54a of the rotation terminating mechanism 6E are brought into contact with each other, which blocks the rotation.

Accordingly, loads (overload) assumed upon designing the pinion gear 7a, the rack gear 8a, the bearings 3e, 3f, 3g, the rack end 8b and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle.

(Second Modified Version of Fourth Embodiment)

Figure 22:
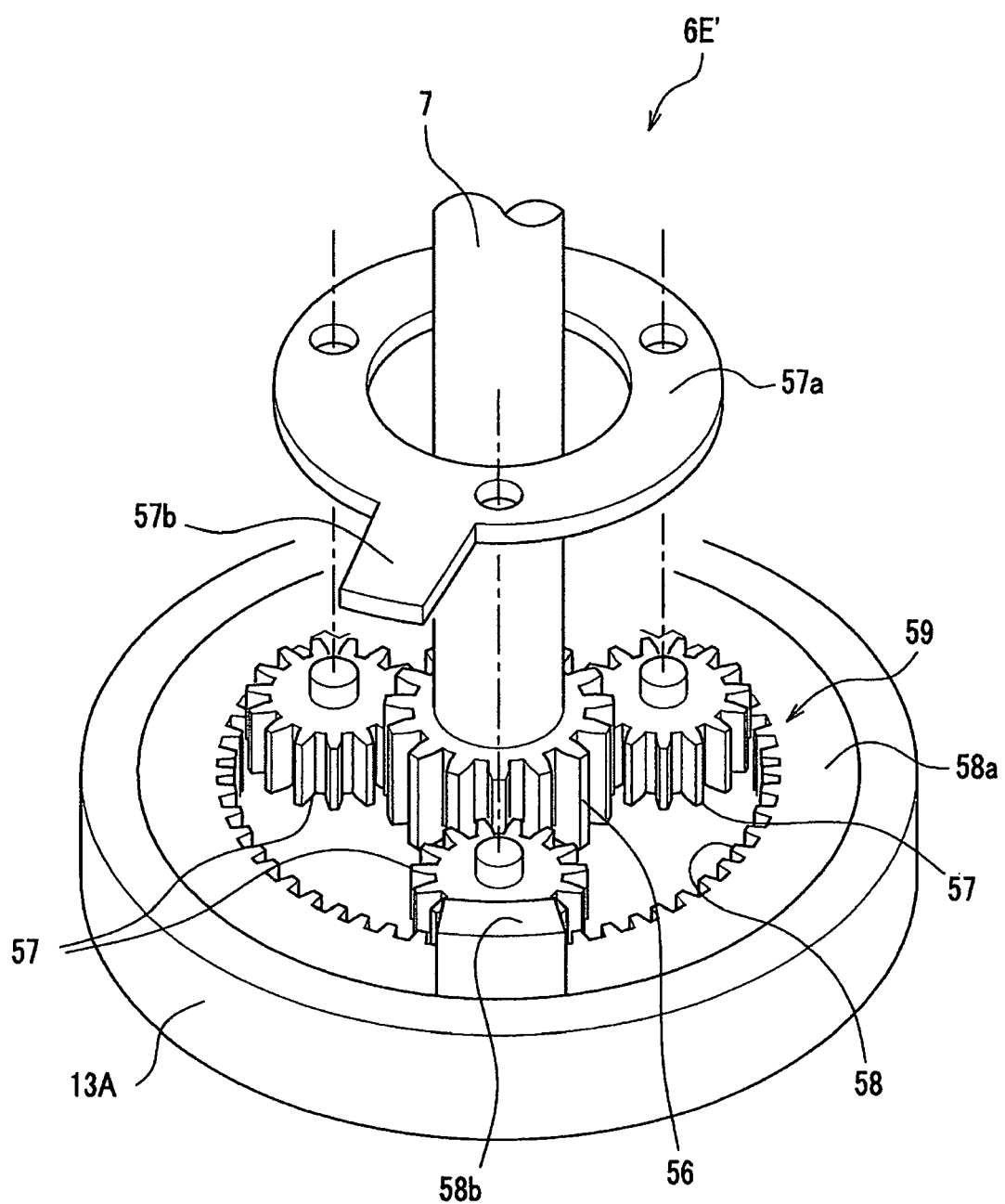
FIG. 22 is a schematic perspective view showing a rotation terminating mechanism of a second modified version of the fourth embodiment using a planetary gear reducer unit.
Figure 24A:
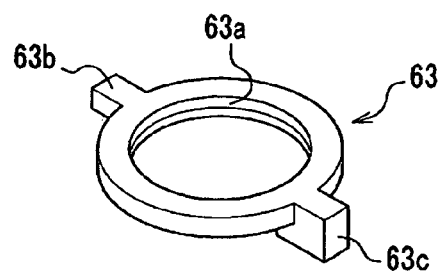
Figure 24B:
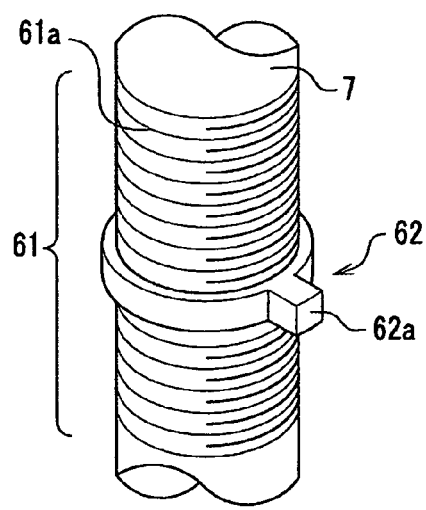
Figure 24C:
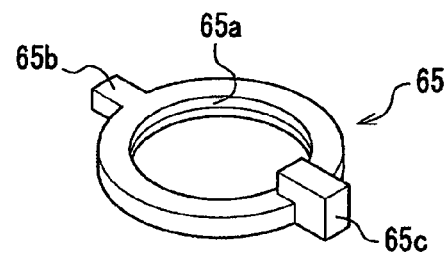
Figure 24D:
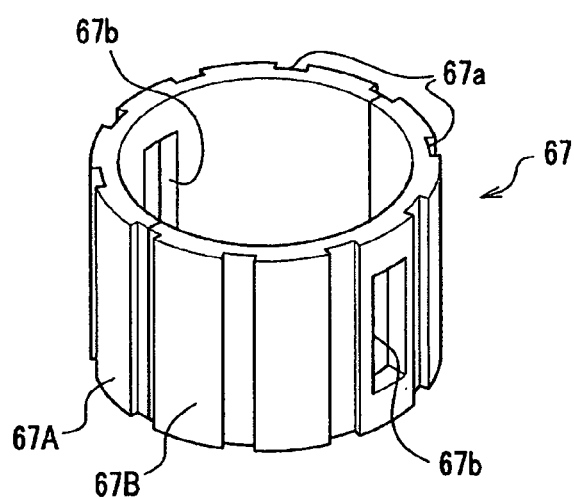

FIG. 22 is a schematic perspective view showing a rotation terminating mechanism of a second modified version of the fourth embodiment using a planetary gear reducer unit. As shown in FIG. 22, the present embodiment has substantially the same structure as that of the second modified version of the first embodiment, except that the position of the rotation terminating mechanism is different and thus that the input shaft 3d (see FIG. 11) is replaced with the pinion shaft 7 in the drawings. Components which are the same as those illustrated in the second modified version of the first embodiment are designated with the same reference characters, and thus a duplicate description is omitted.

By using the planetary gear reducer unit as the deceleration mechanism 55, the rotation terminating mechanism 6E' can be made coaxial with a center axis of the lid portion 13A, and thus the size of the rotation terminating mechanism 6E' in a radial direction can be reduced. In addition, since a load on the projection 57b when the projection 57b is brought into contact with the projection 58b is shared by a plurality of the planetary gears 57 through the planetary carrier 57a, the rotation terminating mechanism 6E' can tolerate a larger load as compared with the case of the rotation terminating mechanism 6E of the second modified version, and thus can be made compact by that amount.

(Third Modified Version of Fourth Embodiment)

FIG. 23 shows schematic plane sections of a rotation terminating mechanism of a third modified version of the fourth embodiment. As shown in FIGS. 23 and 24, the present embodiment has substantially the same structure as that of the third modified version of the first embodiment (see FIG. 12), except that the position of the rotation terminating mechanism is different and thus that the input shaft 3d (see FIG. 13B) is replaced with the pinion shaft 7 in the drawings. Components which are the same as those illustrated in the third modified version of the first embodiment are designated with the same reference characters, and thus a duplicate description is omitted.

In FIG. 23, (a) shows that, when the steering wheel 3 is at a neutral position, the projection 62a is positioned at a center in an axial direction relative to the projections 63c, 65c. (b) shows that, in the "left rack end" state where the rack shaft 8 is fully steered to the left and thus the rack end 8b and the housing end 11a are brought into contact with each other, the projection 62a comes into contact with the projection 65c in an anticlockwise direction (seen from above), and thus the steering wheel 3 cannot be turned further to the left. On the other hand, (c) shows that, in the "right rack end" state where the rack shaft 8 is fully steered to the right and thus the rack end 8b and the housing end 11a are brought into contact with each other, the projection 62a comes into contact with the projection 63c in a clockwise direction (seen from above), and thus the steering wheel 3 cannot be turned further to the right.

Also in the present modified version, like in the fourth embodiment, even when the rack shaft 8 is already in the rack end state and the driver turns the steering wheel 3 further away from the home position, the rotation terminating mechanism 6F blocks the turning operation.

Accordingly, like in the fourth embodiment, loads (overload) assumed upon designing the pinion gear 7a, the rack gear 8a, the bearings 3e, 3f, 3g, the rack end 8b and the rack housing portion 11A can be reduced, and the problem of heavier components, such as larger bearings, a larger module of the gears, a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle.

In the electric power steering device 100D in the fourth embodiment, the torque sensor described above is one configured to convert a torsion angle of the torsion bar 111 into a vertical displacement amount of the slider 115, detect (measure) the displacement amount by the detection coils 114A, 114B, and output a torque signal VT3. Alternatively, any torque sensor may be used.

Fifth Embodiment

Figure 25:
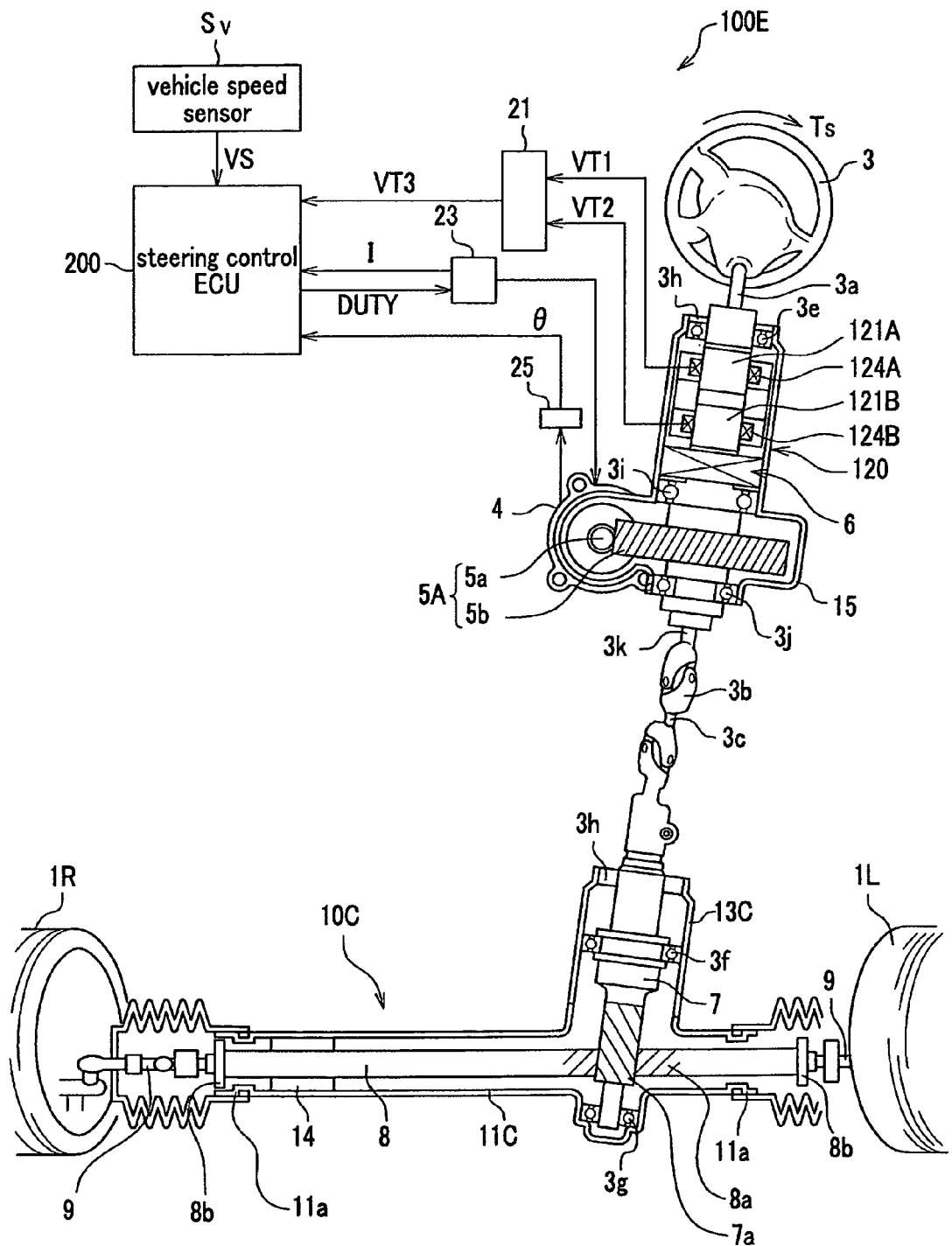
FIG. 25 is a configuration diagram of an electric power steering device according to a fifth embodiment of the present invention.

With reference to FIG. 25, an electric power steering device according to a fifth embodiment of the present invention will be described. As shown in FIG. 25, an electric power steering device 100E of the present embodiment has substantially the same structure as that of the electric power steering device 100C of the third embodiment (see FIG. 15), except that the position of the rotation terminating mechanism is different. Components which are the same as those illustrated in the third embodiment are designated with the same reference characters, and thus a duplicate description is omitted.

The column housing 15 contains the torque sensor 120, the rotation terminating mechanism 6, the bearing 3i, the worm wheel gear 5b and the bearing 3j, in this order.

To put it another way, also in the present embodiment, like in the fourth embodiment, the rotation terminating mechanism 6 is disposed between the torque sensor 120 and the worm wheel gear 5b (deceleration mechanism (auxiliary torque transmission mechanism) 5A), in the axial direction of the steering wheel shaft 3a.

It should be noted that, in FIG. 25, the rotation terminating mechanism 6 is illustrated as one representing the above-mentioned rotation terminating mechanisms 6D, 6E, 6E', 6F, and any of the rotation terminating mechanisms 6D, 6E, 6E', 6F can be used.

According to the present embodiment, like in the fourth embodiment and the modified versions thereof, even when the rack shaft 8 is already in the rack end state and the driver turns the steering wheel 3 further away from the home position, the rotation terminating mechanism 6 blocks the turning operation.

Especially, since the rotation terminating mechanism 6 is provided near the steering wheel 3, the centering of the steering wheel shaft 3a of the steering wheel 3 with the rotation terminating mechanism 6 is facilitated.

Accordingly, loads (overload) assumed upon designing the pinion gear 7a, the rack gear 8a, the bearings 3e, 3f, 3g, the rack end 8b and the rack housing portion 11A can be reduced, and the problem of heavier components, such as larger bearings, a larger module of the gears, and a thicker rack housing portion 11A, and an introduction of a reinforcing rib, can be solved, which may otherwise be necessary for the conventional components for ensuring the durability. As a result, size and weight of the components can be reduced, improving the mountability on the vehicle, especially on the compact vehicle.

The embodiment of the present invention has been described above. However, the present invention is not limited to the above embodiments and modified versions thereof, and it is a matter of course that the above embodiments and modified versions may be properly modified. For example, in all of the embodiments and modified versions thereof, the rotation terminating mechanism is illustrated as one disposed on the member (such as the input shaft 3d and the steering wheel shaft 3a) between the steering wheel 3 and the pinion shaft 7. Alternatively, the rotation terminating mechanism may be disposed on the pinion shaft 7.

What is claimed is:

1. A rack and pinion electric power steering device comprising:
   an operator;
   a torque sensor configured to detect a steering torque generated by an input from the operator;
   an electric motor configured to generate an auxiliary torque in accordance with at least the steering torque generated by the input from the operator which is detected by the torque sensor;
   a steering unit for steering front wheels of a vehicle, the steering unit comprising a pinion shaft to which the auxiliary torque is transmitted;
   a rotation terminating mechanism which provides a motion terminating end of the operator, the rotation terminating mechanism being disposed between the operator and the torque sensor; and
   a rack end mechanism including a housing end adjacent to a housing that stores a rack shaft, the rack shaft having a rack end, the rack end mechanism disposed between the torque sensor and a front wheel, wherein
   when the operator is at a maximum turning angle defined by the rotation terminating mechanism, the rack end and the housing end on a side where a rotation of the operator is regulated by the rotation terminating mechanism do not come in contact with each other.

2. The electric power steering device according to claim 1, wherein the rotation terminating mechanism comprises a deceleration mechanism and is configured to alter an allowable range of turning operation of the operator limited by the motion terminating end.

3. The electric power steering device according to claim 2, wherein
   the rotation terminating mechanism further comprises:
   an input shaft with an external gear, to which a rotation of a rotary shaft of the operator is transmitted;
   a ring gear having an internal gear configured to engage with the external gear of the input shaft, and having a first projection on an outer periphery of the ring gear; and
   a ring-shaped fixed portion surrounding the ring gear, wherein
   the external gear of the input shaft and the internal gear of the ring gear serves as the deceleration mechanism, and
   a second projection configured to limit a rotation of the first projection by being brought into contact with the first projection is provided on an inner periphery of the fixed portion.

4. The electric power steering device according to claim 2, wherein
   the rotation terminating mechanism further comprises:
   a planetary gear reducer unit as the deceleration mechanism comprising an outer ring gear, planetary gears, a planetary carrier and a sun gear, and
   a fixed portion for fixing the outer ring gear, wherein
   a first projection is provided on the planetary carrier,
   a rotation of a rotary shaft of the operator is transmitted to the sun gear, and
   a second projection configured to limit a rotation of the first projection by being brought into contact with the first projection is provided on at least one of the fixed portion and the outer ring gear.

5. The electric power steering device according to claim 2, wherein
   the rotation terminating mechanism further comprises:
   a thread portion with an external thread, to which a rotation of a rotary shaft of the operator is transmitted;
   a first stopper in a ring shape which has a first projection on an outer periphery of the first stopper and is fixed to the thread portion;
   a second stopper which has an internal thread configured to engage with the thread portion, is disposed above the first stopper, and has a second projection configured to be brought into contact with the first projection and formed in a lower face of the second stopper;
   a third stopper which has an internal thread configured to engage with the thread portion, is disposed below the first stopper, and has a third projection configured to be brought into contact with the first projection and formed in an upper face of the third stopper; and
   a guide member configured to limit rotations of the second and third stoppers and move the second and third stoppers along an axial direction of the thread portion, wherein
   the thread portion, the second stopper, the third stopper and the guide member serve as the deceleration mechanism.

6. The electric power steering device according to claim 1, wherein the torque sensor is a magnetostrictive torque sensor.

7. An electric power steering device comprising:
   an operator;
   a torque sensor configured to detect a steering torque generated by an input from the operator;

an electric motor configured to generate an auxiliary torque in accordance with at least the steering torque generated by the input from the operator;

a steering unit for steering front wheels of a vehicle, the steering unit comprising a pinion shaft to which the auxiliary torque is transmitted; and a rotation terminating mechanism which provides a motion terminating end of the operator, the rotation terminating mechanism being disposed between the operator and the pinion shaft, wherein the steering unit for steering the front wheels further comprises an auxiliary torque transmission mechanism, and the rotation terminating mechanism is disposed between the torque sensor and the auxiliary torque transmission mechanism.

8. The electric power steering device according to claim 7, wherein the torque sensor is a magnetostrictive torque sensor.

9. An electric power steering device comprising:

an operator;

a torque sensor configured to detect a steering torque generated by an input from the operator;

an electric motor configured to generate an auxiliary torque in accordance with at least the steering torque generated by the input from the operator which is detected by the torque sensor;

a steering unit for steering front wheels of a vehicle, the steering unit comprising a pinion shaft to which the auxiliary torque is transmitted; and a rotation terminating mechanism which provides a motion terminating end of the operator, the rotation terminating mechanism being disposed between the operator and the torque sensor, wherein the rotation terminating mechanism comprises a deceleration mechanism and is configured to alter an allowable range of turning operation of the operator limited by the motion terminating end.

10. The electric power steering device according to claim 9, wherein the rotation terminating mechanism further comprises:

an input shaft with an external gear, to which a rotation of a rotary shaft of the operator is transmitted;

a ring gear having an internal gear configured to engage with the external gear of the input shaft, and having a first projection on an outer periphery of the ring gear; and a ring-shaped fixed portion surrounding the ring gear, wherein the external gear of the input shaft and the internal gear of the ring gear serves as the deceleration mechanism, and a second projection configured to limit a rotation of the first projection by being brought into contact with the first projection is provided on an inner periphery of the fixed portion.

11. The electric power steering device according to claim 9, wherein the rotation terminating mechanism further comprises:

a planetary gear reducer unit as the deceleration mechanism comprising an outer ring gear, planetary gears, a planetary carrier and a sun gear, and a fixed portion for fixing the outer ring gear, wherein a first projection is provided on the planetary carrier, a rotation of a rotary shaft of the operator is transmitted to the sun gear, and a second projection configured to limit a rotation of the first projection by being brought into contact with the first projection is provided on at least one of the fixed portion and the outer ring gear.

12. The electric power steering device according to claim 9, wherein the rotation terminating mechanism further comprises:

a thread portion with an external thread, to which a rotation of a rotary shaft of the operator is transmitted;

a first stopper in a ring shape which has a first projection on an outer periphery of the first stopper and is fixed to the thread portion;

a second stopper which has an internal thread configured to engage with the thread portion, is disposed above the first stopper, and has a second projection configured to be brought into contact with the first projection and formed in a lower face of the second stopper;

a third stopper which has an internal thread configured to engage with the thread portion, is disposed below the first stopper, and has a third projection configured to be brought into contact with the first projection and formed in an upper face of the third stopper; and a guide member configured to limit rotations of the second and third stoppers and move the second and third stoppers along an axial direction of the thread portion, wherein the thread portion, the second stopper, the third stopper and the guide member serve as the deceleration mechanism.

13. The electric power steering device according to claim 9, wherein the torque sensor is a magnetostrictive torque sensor.

* * * * *